United States Patent [19]
Carroll

[11] Patent Number: 4,719,014
[45] Date of Patent: * Jan. 12, 1988

[54] CYCLONE SEPARATOR

[76] Inventor: Noel Carroll, Sherbrooke Road, Sherbrooke, Victoria, Australia

[*] Notice: The portion of the term of this patent subsequent to Oct. 1, 2002 has been disclaimed.

[21] Appl. No.: 11,455

[22] Filed: Feb. 6, 1987

Related U.S. Application Data

[63] Continuation of Ser. No. 754,395, Jul. 11, 1985, which is a continuation-in-part of Ser. No. 472,015, Mar. 4, 1983, Pat. No. 4,544,486, which is a continuation-in-part of Ser. No. 449,395, Dec. 13, 1982, Pat. No. 4,464,264.

[30] Foreign Application Priority Data

| Mar. 4, 1982 [AU] | Australia | PF2973/72 |
| Mar. 11, 1982 [AU] | Australia | PF3061/82 |
| May 14, 1982 [AU] | Australia | PF4016/82 |
| May 14, 1982 [AU] | Australia | PF4017/82 |
| Aug. 10, 1982 [AU] | Australia | PF5314/82 |

[51] Int. Cl.$^4$ .......................................... B01D 17/038
[52] U.S. Cl. .................................. 210/512.1; 209/144; 209/211
[58] Field of Search ................. 210/512.1, 788, 512.2, 210/304; 209/211, 144; 55/447

[56] References Cited

U.S. PATENT DOCUMENTS 4,237,006 12/1980 Coleman et al. ..................... 210/788
4,544,486 10/1985 Carroll ............................... 210/512.1

Primary Examiner—Frank Sever
Attorney, Agent, or Firm—Ladas & Parry

[57] ABSTRACT

Cyclone separator having a separating chamber with a primary portion of greater diameter at one end than at the other with at least one tangential feed inlet to the primary portion and two outlets each arranged axially and one extending from one end as the primary portion and the other from the other end thereof. The cyclone separator has a secondary portion leading from the smaller diameter end of the secondary portion and arranged to provide a constriction against flow therethrough. The outlet from the larger diameter end has a stepped bore.

20 Claims, 27 Drawing Figures

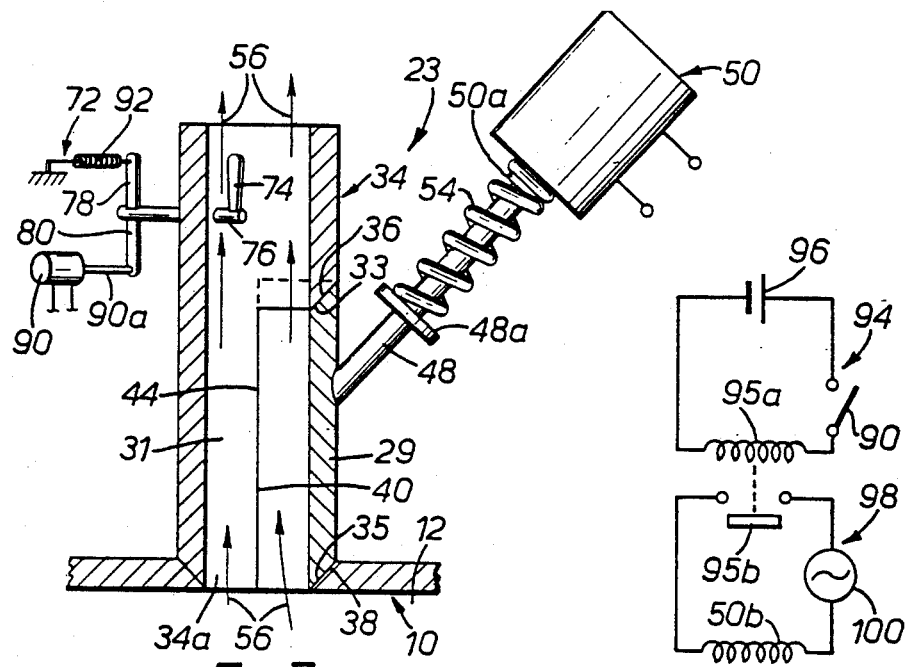
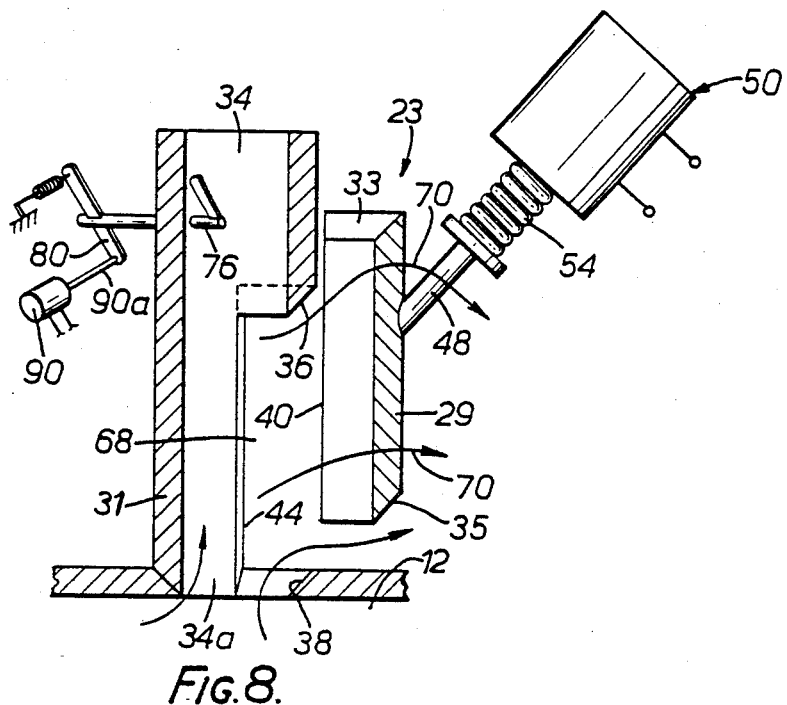
FIG. 7.
FIG. 9.
FIG. 8.

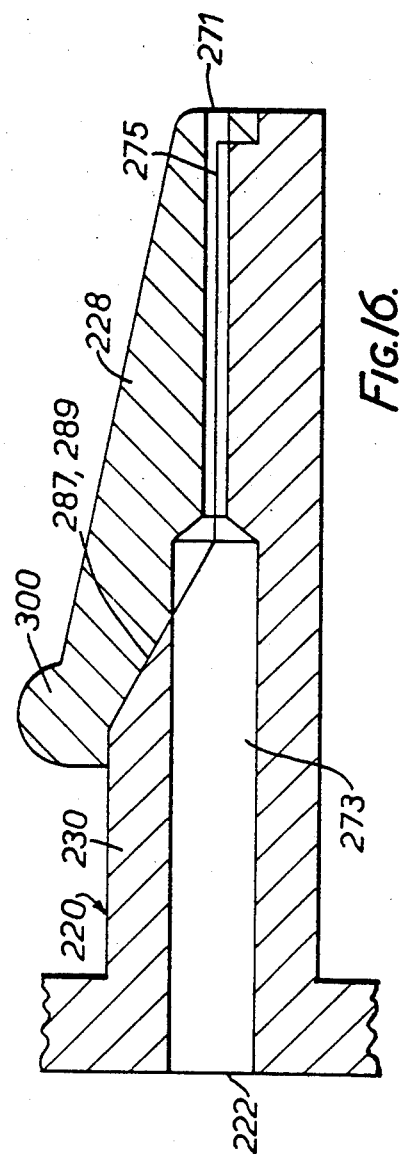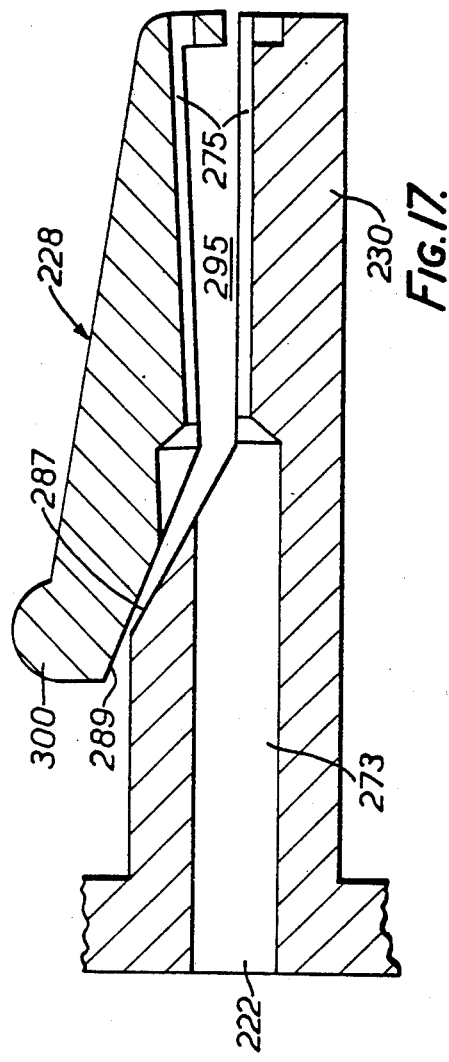

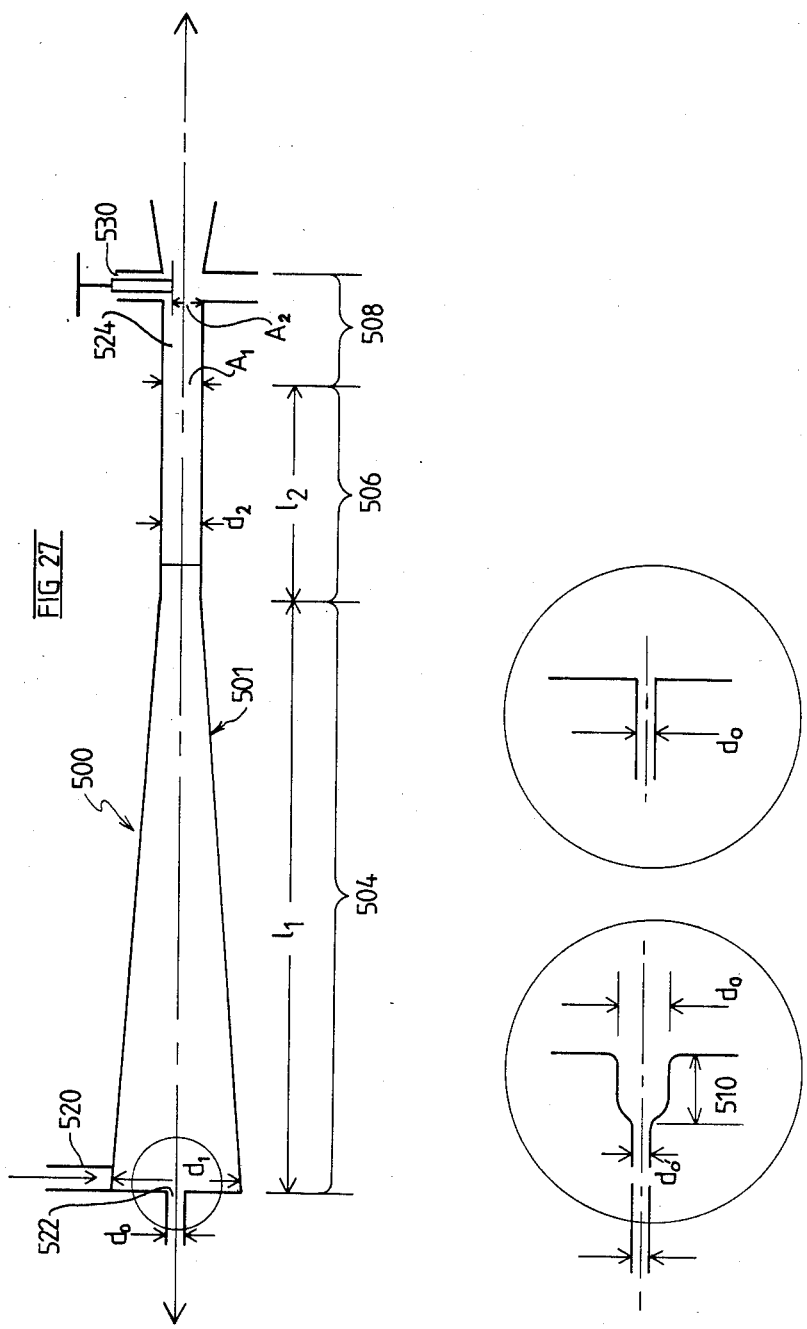

CYCLONE SEPARATOR

This is a continuation of co-pending application Ser. No. 754,395 filed July 11, 1985 which is a continuation-in-part of U.S. Ser. No. 472,015 filed Mar. 4, 1983, which is a continuation-in-part of U.S. Ser. No. 449,395, filed Dec. 13, 1982. U.S. Ser. No. 472,015 issued as U.S. Pat. No. 4,544,486 and U.S. Ser. No. 449,395 issued as U.S. Pat. No. 4,464,264.

BACKGROUND OF THE INVENTION (i) Field of the Invention

This invention relates to cyclone separators.

(ii) Prior Art

U.S. Pat. No. 4,237,006 (Colman et al) describes a cyclone separator having a separating chamber having first second and third contiguous cylindrical portions arranged in that order, the first cylindrical portion being of greater diameter than the second cylindrical portion and the third cylindrical portion being of lesser diameter than the second cylindrical portion, the first cylindrical portion having an overflow outlet at the end thereof opposite to said second cylindrical portion and a plurality of tangentially directed feed inlets, the separator being adapted to separate liquids one from the other in a mixture when infed into said separating chamber via said feed inlets, one said liquid emerging from said overflow outlet and the other emerging from the end of said third cylindrical portion remote from said first cylindrical portion.

The above separator is intended specifically, but not exclusively, for separating oil from water, the oil in use emerging from the overflow outlet and the water from said third cylindrical portion.

The aforementioned cylindrical portions may not be truly cylindrical, in the sense that they do not need in all cases to present a side surface which is linear in cross-section and parallel to the axis thereof. For example, U.S. Pat. No. 4,237,006 describes arrangements wherein the first cylindrical portion has a frustoconical section adjacent the second cylindrical portion and which provides a taper between the largest diameter of the first cylindrical portion and the diameter of the second cylindrical portion where this meets the first cylindrical portion. Likewise, the aforementioned patent specification describes arrangements wherein a similar section of frustoconical form is provided to cause a tapering in the diameter of the second cylindrical portion from a largest diameter of the second cylindrical portion to the diameter of the third cylindrical portion. There is also described an arrangement wherein the second cylindrical portion exhibits a constant taper over its whole length.

A difficulty has been found in operating cyclone separators of the kind described in U.S. Pat. No. 4,237,006 in that proper and reliable separating action is not always achieved, and contamination of the heavier liquid component (that emerging from the aforementioned third cylindrical portion of the separator) with the lighter liquid component sometimes occurs. Another difficulty has been that the outlet for the lighter component will frequently become blocked by debris, thus interfering with operation of the separator.

In accordance with one aspect of the present invention there is provided a cyclone separator comprising elements designed, sized and arranged for treating a mixture of fluids and more particularly an oil/water mixture for separating a more dense component from a less dense component thereof, said separator comprising a separating chamber having a primary portion which has a greater cross-sectional diameter at one end than at its other end and further having an overflow outlet at said one end thereof and an underflow outlet at said other end; at least one tangentially directed feed inlet proximate to said one end, said separator further including means designed, sized and arranged for acting to preclude contamination of the more dense component emerging from the underflow outlet by the less dense component, said means having an inlet end downstream of said other end of said primary portion with respect to the direction of flow of said separated more dense component, and an outlet end, said means presenting a passageway for throughflow of the more dense component, the diameter of which passageway has a diameter at said outlet end thereof which is from $\frac{1}{2}$ to 0.8 the diameter thereof at said inlet end thereof.

Preferably, the primary portion is of length which is at least ten times its diameter at the plane of the feed inlet. The means for precluding contamination may take several forms. For example, it may be comprised by a secondary portion of the separating chamber at the underflow outlet. In one arrangement, the primary portion may comprise a first cylindrical section and a second cylindrical section contiguous therewith the overflow outlet being disposed at an end of the first section remote from the second section. The second section may have the underflow outlet at an end thereof remote from the first section. In this arrangement, the means for precluding contamination may be comprised by a third section at the underflow outlet.

In another arrangement, the primary portion may comprise a frustoconical section and the means for precluding contamination be comprised by a secondary portion of the separating chamber at the underflow outlet. In yet another arrangement, the aforementioned means may include an outlet pipe extending from the underflow outlet, the outlet pipe preferably having a substantially constant diameter.

According to another aspect of the present invention there is provided a cyclone separator comprising elements designed, sized and arranged for treating a mixture of fluids for separating a more dense component from a less dense component thereof, said separator comprising a separating chamber having a primary portion which has a greater cross-sectional dimension at one end than at its other end and further having an overflow outlet at said end end thereof and an underflow outlet at said other end; at least one tangentially directed feed inlet proximate to said one end said overflow outlet being in the form of a stepped bore including: a first bore portion having a diameter of sufficient size to facilitate the preclusion of blocking therein, the first bore portion being adjacent said one end of said primary portion of said separating chamber and a second bore portion of lesser diameter than the first bore portion the diameter of the second bore portion being sufficiently large to permit continuous operation of the overflow outlet, the second bore portion being further from said one end of said primary portion.

According to a further aspect of the present invention there is provided a cyclone separator comprising elements designed, sized and arranged for treating a mixture of fluids for separating a more dense component from a less dense component thereof, said separator comprising a separating chamber having a primary portion which has a greater cross-sectional dimension at one end than at its other end and further having an overflow outlet at said other, end; at least tangentially directed feed outlet proximate to said one end said overflow outlet being in the form of a stepped bore including: a first bore portion having a diameter of sufficient size to facilitate the preclusion of blocking therein, the first bore portion being adjacent said one end of said primary portion of said separating chamber; and a second bore portion of lesser diameter than the first bore portion the diameter of the second bore portion being sufficiently large to permit continuous operation of the overflow outlet, the second bore portion being further from said one end of said primary portion, the separator having means designed, sized and arranged for acting to preclude contamination of the denser component emerging from said other end of said primary portion, said means comprising a constriction at said other end.

According to yet another aspect of the present invention there is provided a cylone separator comprising elements designed, sized and arranged for treating a mixture of fluids for separating a more dense component from a less dense component thereof, said separator having a separating chamber having a primary portion which has a greater cross-sectional dimension at one end thereof than at its other end and further having an overflow outlet at said one end and an underflow outlet at said other end; at least one tangentially directed feed inlet proximate to said one end said separator further including means designed, sized and arranged for acting to preclude contamination of the dense component emerging from said other end portion by said less dense component, said means comprising a constriction at the other end of the primary portion, said construction presenting a passageway for throughflow of said dense component, the cross-sectional dimension of which passageway decreases away from the said other end of said primary section to a dimension in the range ⅓ to 0.8 of the dimension of the passageway at the end of said constriction closest said other end of said primary portion; said overflow outlet being in the form of a stepped bore including a first bore portion having a dimension of sufficient size to facilitate the preclusion of blocking therein, the first bore portion being adjacent said one end; and a second bore portion of lesser dimension than the first bore portion, the dimension of the second bore portion being sufficiently large to permit continuous operation of the overflow outlet, the second bore portion being further from said primary portion.

Preferably, the overflow outlet is provided with means selectively operable to vary the cross-sectional area of said outlets for permitting clearing of a blockage when occurring in that outlets. Furthermore, flow sensitive means may be provided positioned and operable for detecting a decrease in flow through the outlets and for operating the area varying means for increasing the cross-sectional area for the clearing.

Preferably, the outlet is in the form of an outlet pipe and the cross-sectional area varying means comprises a mechanism including a portion of the wall of the pipe which is so movable as to open the side of the pipe to the exterior thereof. Preferably, the aforementioned portion is a side segment of the pipe which is movable outwardly away from the remainder of the pipe under influence of the mechanism.

The mechanism may include an electromagnet and the flow sensitive means operates to apply electric current to the electromagnet for effecting movement of the segment away from the remainder of the pipe on said detecting of decrease in flow.

In another arrangement, the pipe wall portion is pivotally movable away from the remainder of the pipe. In this form, the pipe wall portion is arranged to be subject, in use, to a bias towards a position effecting the opening of the side of the pipe, and the flow sensitive means is positioned to be normally acted upon directly by flow through the pipe to impart a force thereon which is directed against the outlet pipe wall portion to maintain it closed, the force, however, being reduced in the case of reduced flow through the pipe due to blockage whereby the aforementioned bias effects movement to open the side of the pipe. Preferably, the flow sensitive means comprises a pivotal lever having two arms extending from a location at which the lever is pivotal to the remainder of the pipe, one arm being formed with means in use subjected flow thereonto from the separator and the other engaging the pipe wall portion.

The stepped bore arrangement described above has several advantages. For example, it is believed to create secondary recirculating flows which can be used to advantage to reduce the blocking effects of the solids at the overflow outlet end. These recirculating flows are believed to tend to "sweep" the core area of the flow and cause any solids to be removed via the underflow end. Furthermore, the inclusion of a stepped bore arrangement has permitted more efficient deblocking devices (of the mechanical type) be employed. Without the stepped bore arrangement this particular zone is relatively congested and cumbersome. Finally, there has been found to be a reduction in cavitation erosion as a result of the stepped bore arrangement.

The invention is further described with reference to the accompanying drawings in which:

FIG. 7 is a cross-section showing part of the cyclone separator of FIG. 5, and outlet thereof, and the area varying means when conditioned in the same condition as FIG. 5;

FIG. 8 is a view like FIG. 7 but showing the outlet area varying means in the condition of FIG. 6;

FIG. 9 is an electric circuit diagram of electric control means associated with the area varying means;

FIGS. 16 and 17 are respective axial cross-sections of the area varying means of FIG. 13, in two different operative conditions;

FIG. 27 is a sectional side elevation of another form of cyclone separator constructed in accordance with the invention, with two enlargements of alternative overflow outlet end portions.

Figure 1:
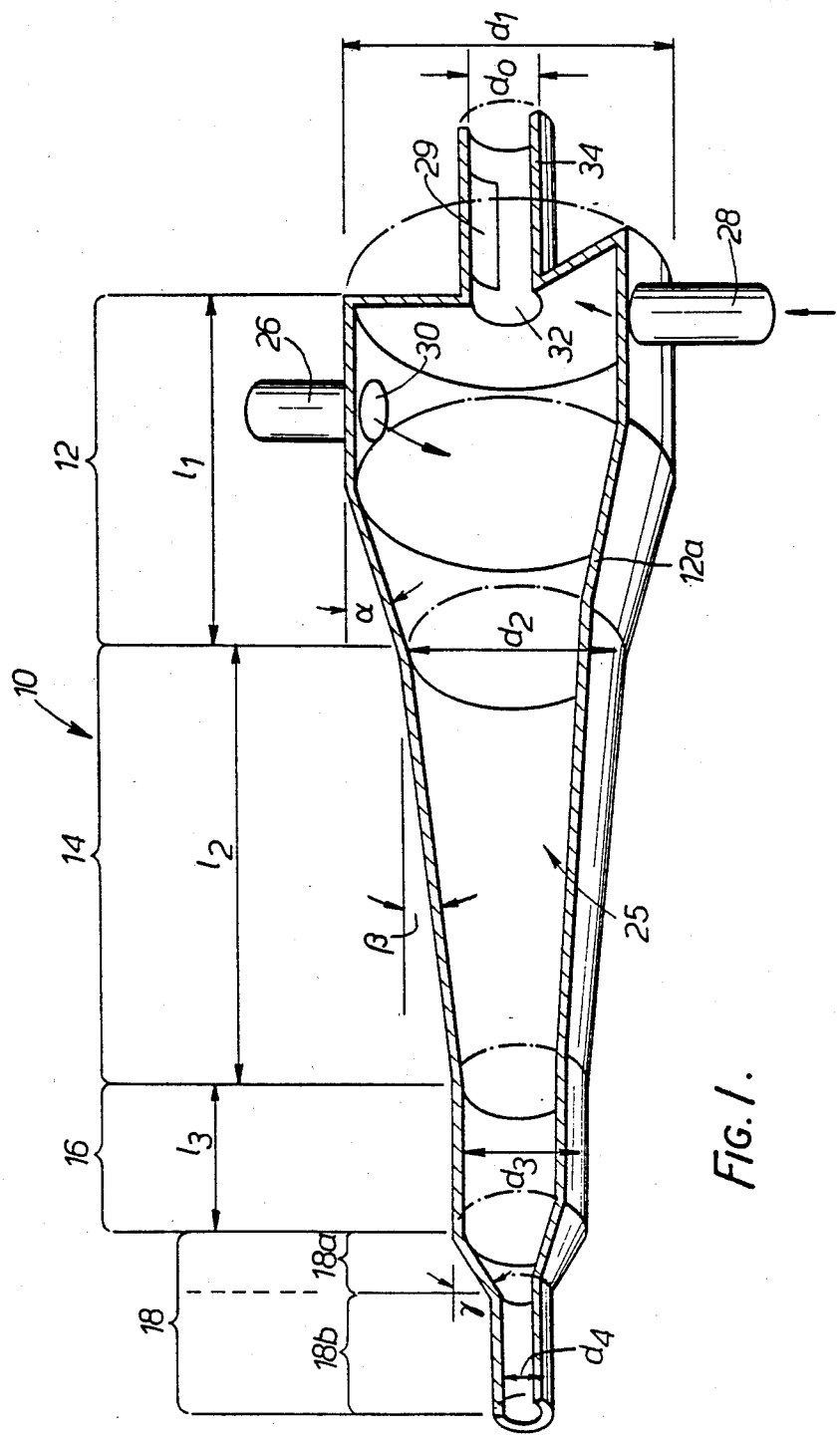
FIG. 1 is a cutaway perspective view of a cyclone separator constructed in accordance with this invention.

The separator 10 shown in FIG. 1 has a separating chamber 25 having a primary portion comprising first, second and third cylindrical portions 12, 14 and 16 coaxially arranged in that order. These cylindrical portions are generally similar to the corresponding first, second and third cylindrical portions of the separating chamber of the cyclone separator described in the aforementioned U.S. Pat. No. 4,237,006, the disclosures of which are hereby incorporated into the present specification to form part thereof. Most particularly, the first cylindrical portion 12 has two feed pipes 26, 28 associated therewith, these being arranged to lead tangentially into the cylindrical portion 12 via respective inlet apertures of which only one aperture, namely aperture 30 associated with pipe 26, is visible in the drawing. The two feed inlet apertures are diametrically arranged one relative to the other and positioned close to the end of portion 12 remote from portion 14. The end of portion 12 remote from portion 14 also has a circular outlet opening 32 which leads to an overflow outlet pipe 34.

Cylindrical portion 12 is not of constant diameter over its whole length, the part 12a thereof adjacent portion 14 exhibiting a taper towards the second cylindrical portion 14. As explained in U.S. Pat. No. 4,237,006 however, such tapered section is not essential.

The second cylindrical portion 14 exhibits a taper over its length, tapering from a diameter at the end adjacent section 12 equal to the diameter of portion 12 at the junction between the two portions to a somewhat lesser dimension at its opposite end. Cylindrical portion 16 is a constant diameter equal to the minimum diameter of portion 14.

In the drawing, the length $l_1$ of portion 12, its diameter $d_1$, the taper angle $\alpha$ of the tapered part of cylindrical portion 12, the internal diameter $d_o$ of the outlet pipe 34, the length and diameter $l_2$, $d_2$ of the second portion 14, the taper angle $\beta$ of the second portion 14 and the length $l_3$ and diameter $d_3$ of the third cylindrical portion, as well as the total area $A_i$ of the two feed inlet apertures 30 may all be selected in accordance with the parameters mentioned in U.S. Pat. No. 4,237,006 save that the outlet diameter $d_o$ need not constrained to be within limits as described therein In accordance with this invention, a fourth portion (secondary portion) is added to the separating chamber 25, this portion being designated by reference numeral 18 in the figure. Portion 18 has a part 18a adjacent portion 16 which is of frustoconical configuration, tapering from a maximum diameter equal to $d_3$ at its end closest to and adjoining to the outlet end of cylindrical portion 16, to a diameter $d_4$ at its outlet end. At the outlet end of part 18a, fourth portion 18 includes an outlet pipe 18b which is of internal diameter $d_4$.

Preferably, the angle $\alpha$, being the conicity or half-angle of the frustoconical surface of part 18a is about 45°, although angles in the range 30° to 60° are generally satisfactory. In any event, it is preferred that the ratio $d_4/d_3$ be in the range 1:3 to 2:3. The length of part 18a is not critical to the invention and in any event is normally fixed by the selection of the aforementioned ratio of diameters $d_4$ to $d_3$. Likewise, the length of the pipe 18b has not been found to be important to the operation of the invention.

Although part 18a is shown as having a truly frustoconical cross-sectional form (that is to say it is shown as having a side surface which exhibits a linear sloping configuration relative to the axis of the portion when viewed in section) this is not essential. The part 18 may have a conicity angle which varies along the length thereof such as either increasing or decreasing the direction from the greater diameter end to the lesser diameter end thereof. In any event, it is preferred that the length of the part 18 be roughly the same as the maximum diameter thereof.

In use, liquid to be separated is admitted tangentially to the interior of cylindrical portion 12 via feed pipes 26, 28, the denser component of the liquid then travelling lengthwise through the separator to emerge from pipe 18b, whilst the lighter component emerges from pipe 34.

Figure 18:
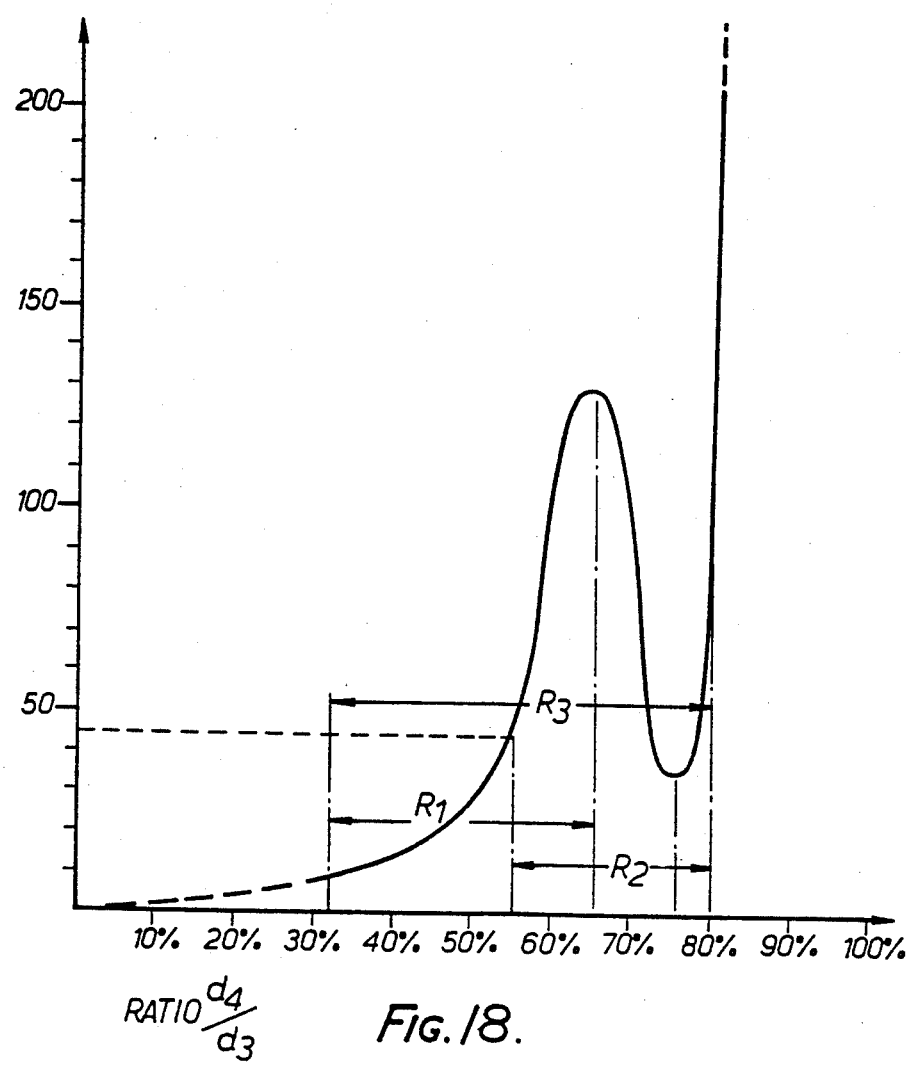
FIG. 18 is a graph illustrating influence of outlet constriction on separating performance of the separator of FIG. 1.
Figure 19:
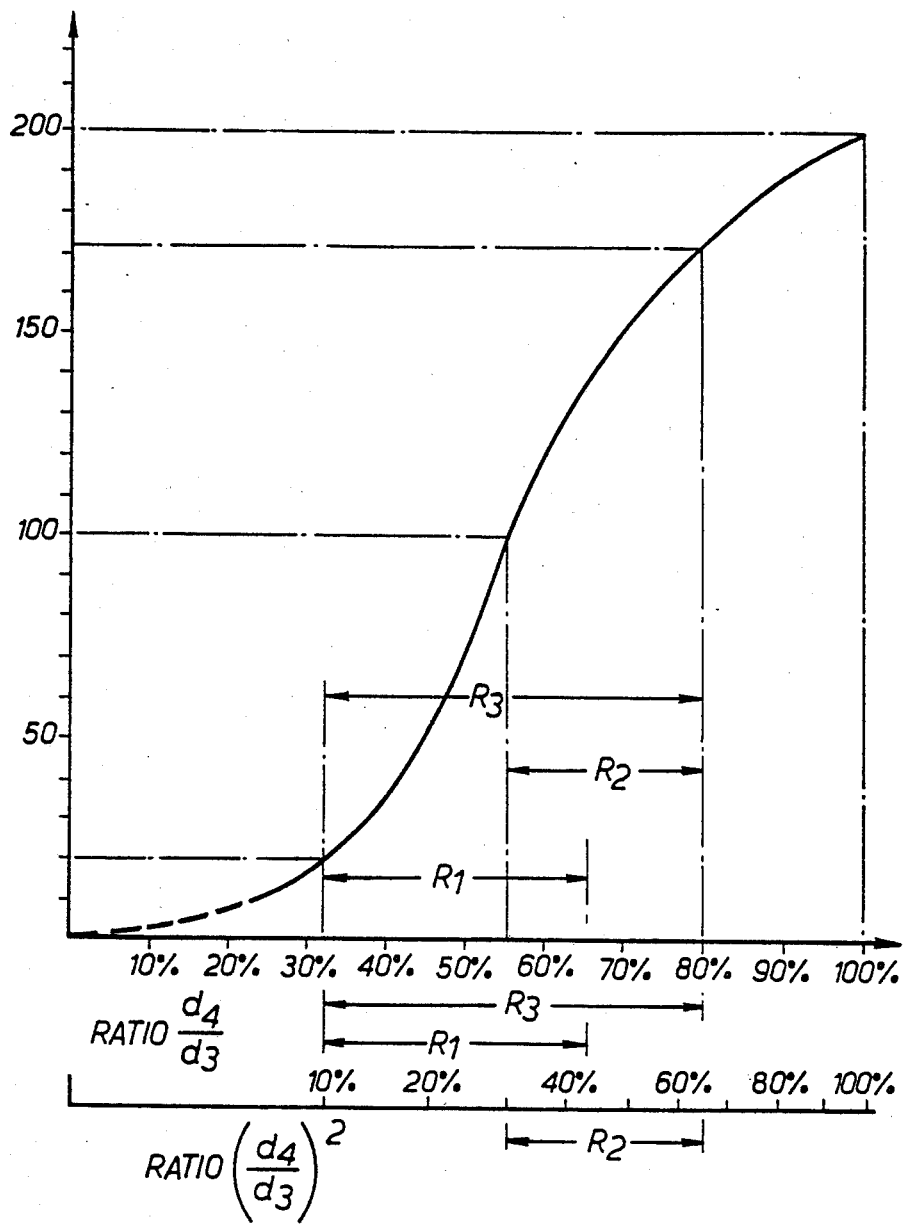
FIG. 19 is a graph illustrating influence of outlet constriction on delivery flow from the separator of FIG. 1.

FIGS. 18 and 19 show experimental results obtained by operating an experimental oil separator of the form shown in FIG. 1 with various fourth portions 18 presenting different end diameters $d_4$. The third portion 16 of this separator had a diameter $d_3$ of 29 mm. Under operating conditions, with the fourth portion 18 removed, the exit flow rate from the separator when separating an oil-water mixture was 200 liter/minute. The experimental separator was tested using a mixture of oil and water with the oil concentration being approximately 7500 p.p.m.

As shown in FIG. 18, the separating action of the separator was found to be heavily dependent on the exit diameter $d_4$. Only when diameter was reduced to give a ratio $d_4/d_3$ of 80% or less did the residual oil concentration in water exiting from the portion 18 exhibit a magnitude (130 p.p.m.) which was judged satisfactory. Further decrease in the ratio $d_4/d_3$ brought about a corresponding decrease in residual oil concentration until a minimum residual concentration of about 35 p.p.m. was achieved at a diameter ratio of about 76%. Further decrease in the diameter ratio caused decreased separation efficiency, the residual oil concentration rising with diameter ratio decrease until a diameter ratio of about 66% was reached, at which the residual oil concentration was about 130 p.p.m. On further decrease in the ratio $d_4/d_3$ the residual oil concentration again fell, the concentration being about 45 p.p.m. at a ratio of 55%.

The aforementioned range 1:3 to 2:3 for the ratio $d_4/d_3$, represented in FIGS. 18 and 19 as range $R_1$, has been found satisfactory in many applications giving good separation, whilst ensuring reliable operation, where operating considerations do not require maintenance of highest flow rates through the separator. As shown in FIG. 19, the flow rate through the experimental separator was found to exhibit relatively small fall off where the ratio $d_4/d_3$ was large. However the flow rate falls rapidly once the ratio falls below about 55% at which ratio the flow rate was found to be one half of that prevailing when no fourth portion 18 was provided. The lower limit of the range $R_1$ for ratio $d_4/d_3$ is established at $33\frac{1}{3}\%$ based on the observation that below this ratio insufficient flow could be achieved through the separator for effective operation to occur. As evidence from FIG. 19, the flow rate at this value for $d_4/d_3$ was about 20 liter/minute in the experimental separator giving a flow rate of some 10% of the flow rate with no portion 18 provided. The upper limit of $66\frac{2}{3}$ for $R_1$ is established on the basis that although good separating operation can be achieved above this level, care in operating is necessary to ensure that transitory fluctuations in flow do not cause higher levels of retained oil. Notwithstanding this, however, it has been found that where efficient separation is needed together with preservation of high flow through the separator, operation in the range $R_2$ shown for the ratio $d_4/d_3$ is preferable. The lower limit for Range $R_2$ is established at a value of $d_4/d_3$ equal to 55%, being the value at which the flow rate is still one half of that prevailing with no portion 18 provided. The upper limit for range $R_2$ is established at a value of ratio $d_4/d_3$ equal to about 80%, this representing the maximum value at which adequate oil separating efficiency is retained. At this ratio, the flow rate through the experimental separator was largely unaffected by the presence of portion 18, being about 185 liter/minute or some 93% of the original rate, as evident from FIG. 19. At that ratio, the residual oil concentration was as mentioned about 130 p.p.m. Thus, the overall range of ratios $d_4/d_3$ for possible operation is the range $R_3$ shown, extending from about $33\frac{1}{3}\%$ to about 80%. The ranges $R_1$, $R_2$, $R_3$ may alternatively be expressed in terms of ratios of cross sectional areas of the portions 18 and 16 (i.e. as ratios $(d_4)^2/(d_3)^2$. FIG. 19 has a scale marked in area ratios from which the area ratios corresponding to given ratios ($d_4/d_3$) may be approximated. The ranges $R_1$, $R_2$, $R_3$ when so expressed in area ratios $(d_4/d_3)^2$ having the following limits:

$R_1$; $(d_4/d_3)^2 = 10\%$ to 45%
$R_2$; $(d_4/d_3)^2 = 30\%$ to 65%
$R_3$; $(d_4/d_3)^2 = 10\%$ to 65%.

Furthermore, the ratios $d_4/d_3$ and $(d_4/d_3)^2$ are measures of the resistance to flow through portion 18. This resistance may also be expressed as a percentage $f_1/f_2$ of the flow which would prevail if no portion 18 were provided, "$f_1$" representing the flow with portion 18 and $f_2$ the flow when there is no portion 18. The ranges $R_1$, $R_2$, and $R_3$ have the following limits, ascertainable from FIG. 19, when expressed in terms of such percentage flow:

$R_1$; $(f_1/f_2) = 10\%$ to 50%
$R_2$; $(f_1/f_2) = 50\%$ to 93%
$R_3$; $(f_1/f_2) = 10\%$ to 93%.

Figure 2:
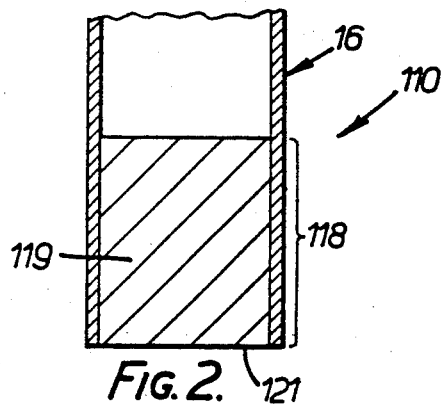
FIG. 2 is a fragmentary lengthwise section of a modified cyclone separator in accordance with the invention.

The modified cyclone separator 110 shown in FIG. 2 is identical to that shown in FIG. 1 save that the pipe 18b is omitted and a modified fourth portion 118 is provided. instead of portion 18. Portion 118 is of the same diameter as portion 16 but is filled with sand particles 119 whereby to provide resistance to flow therethrough. The size and density of packing of sand particles and the length of portion 118 are selected to provide a resistance to flow similar to that provided by part 18a of portion 18. Where the separator 110 is vertical, the sand may be supported on a suitable meshing such as the meshing 121 shown. Otherwise suitable retaining meshing may be provided at either end of portion 118.

In a still further alternative construction (not shown) resistance to flow through portion 118 is provided by partial flattening of portion 118 or by retaining a suspended ball in a cage therein.

Figure 3:
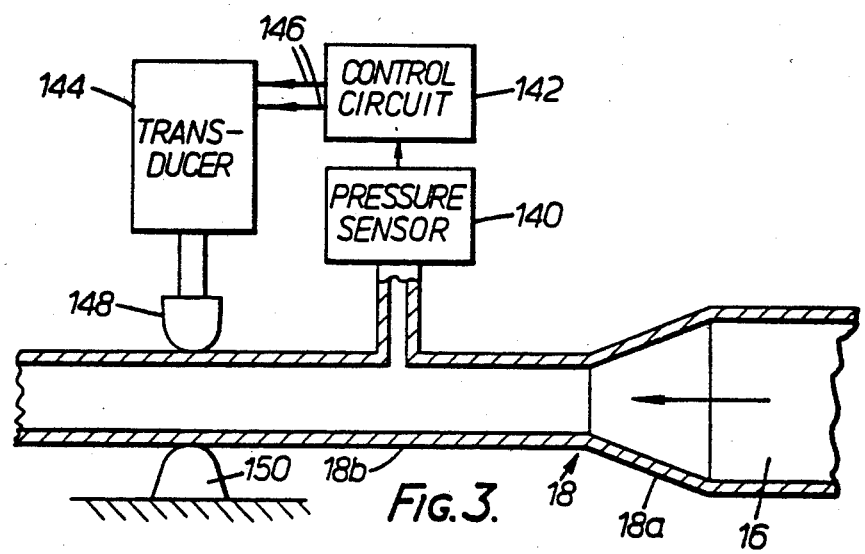
FIG. 3 is a fragmentary lengthwise section of another modified cyclone separator in accordance with the invention.
Figure 4:
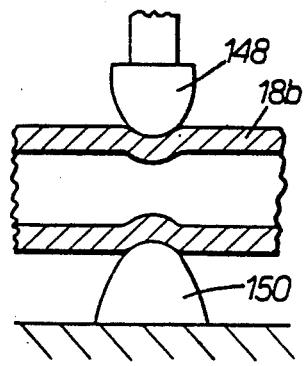
FIG. 4 is a scrap view corresponding to part of FIG. 3, but showing the separator in use.

In the modification shown in FIGS. 3 and 4, the pipe 18b is formed of a flexible tube. A pressure sensor 140 is provided connected to be sensitive to fluid pressure at the inlet end of the pipe 18b and to provide an electrical signal at its output which is representative of that pressure. A control circuit 142 is connected to receive signal from sensor 140 and to provide an output signal which is coupled to an electromechanical transducer 144 via lines 146 as shown. Transducer 144 might, for example, be in the form of a solenoid but in any event is of a kind having an element 148 which is capable of movement under control of the control circuit 142 so as to adopt a position which is dependent upon the fluid pressure as sensed by sensor 140. Element 148 is disposed to one side of the tube comprising pipe 18b and a fixed element 150 of somewhat similar configuration is provided immediately opposite element 148 and to the opposite side of the tube defining pipe 18b. The arrangement is such that, on detection of decrease of fluid pressure as sensed by sensor 140, control circuit 142 controls transducer 144 to move element 148 inwardly towards element 150 to constrict the pipe 18b, by deformation of the wall of the tube thereof as shown in FIG. 4. Thus, on detection of fluid pressure decrease, the cross-sectional area of pipe 18b is decreased. Correspondingly, if increase of pressure is detected by sensor 140, control circuit 142 moves element 148 away from element 150 to release the constriction to some extent. By this means, the resistance to flow presented by the pipe 18b can be varied in accordance with the determined pressure at the inlet end of the pipe 18b.

Figure 20:
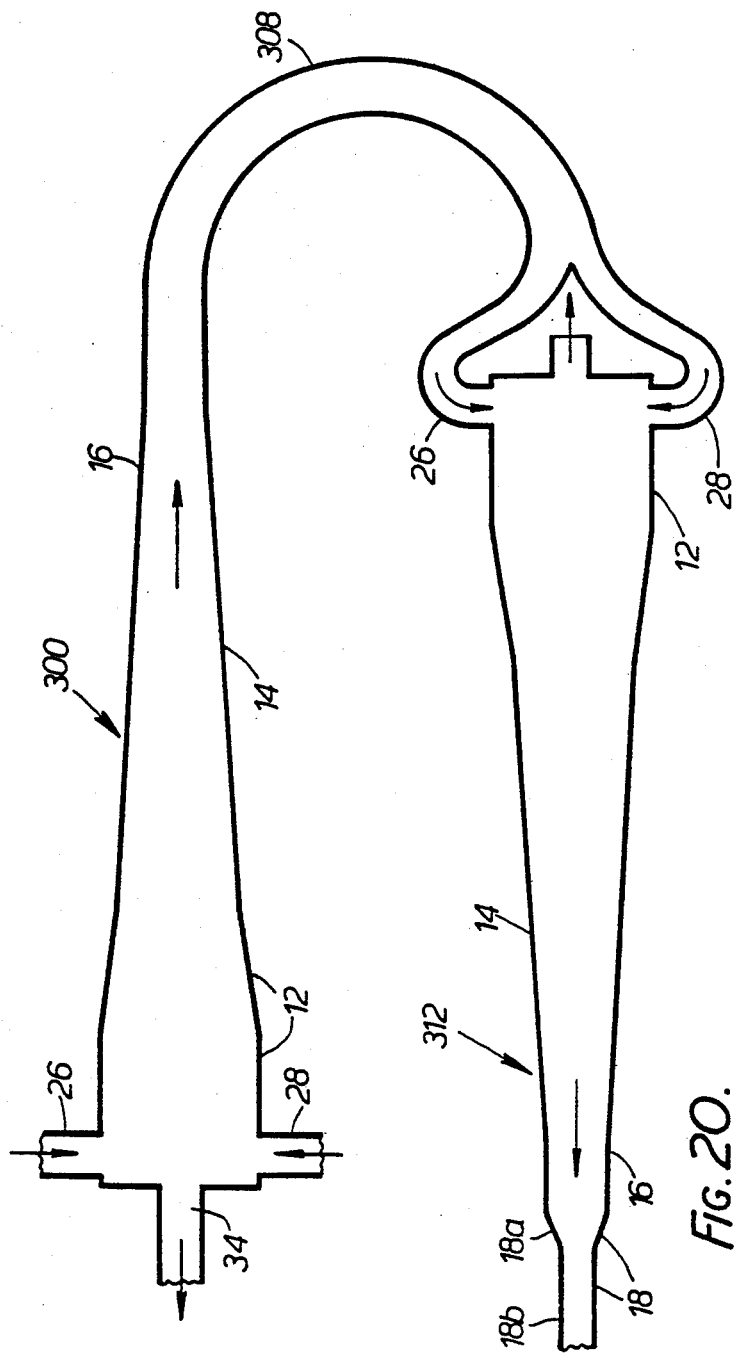
FIG. 20 is a diagram showing interconnection of two cyclone separators, in accordance with this invention.

The above described arrangements for providing restriction to outflow from the separator have been found to be effective in ensuring adequate operation of the separator. More particularly, in the absence of such constriction, it is observed that, generally, the outflow via cylindrical portion 16, which should, for effectiveness of the separator, comprise only the more dense component of the liquids to be separated, will tend to be contaminated with the lighter component liquid. It is believed that this effect arises because it is necessary to provide a "back pressure", by inducing flow restriction, for outflow via portion 16 and the described constrictions effectively provide such back pressure. In cases where two or more separators are coupled in series it has been found sufficient that the second separator only be provided with a specific flow restriction device since the second separator itself can satisfactorily act as a flow restriction device for the first separator. FIG. 20 shows two separators 300, 312 of which separator 312 is of the form shown in FIG. 1. The feed pipes 26, 28 for separator 312 are however coupled by a branched pipe 308 to the outlet end of a separator like the separator of FIG. 1, save that the cylindrical portion 18 is omitted. In use oil-water mixture is introduced first into separator 300, separated oil leaving via outlet 34 thereof. The water component, possibly still with some oil content, is taken from the outlet of the separator provided by cylindrical portion 16 thereof via pipe 308 to the separator 312. Further oil is separated by the separator 312, leaving via the outlet 34 thereof. Water is exited from separator 312 via portion 18 thereof. In this arrangement, separator 312 provides the flow restriction necessary for proper operation of separator 300.

As best shown in FIGS. 5 to 8, the outlet pipe 34 of the separator of FIG. 1 may be provided with an area varying means 23 constructed in accordance with this invention. More particularly, the area varying means includes a segment 29 of the pipe 34 which is constructed so as to be removable from the remainder 31 of the pipe 34. Segment 29 has part frustoconical end surfaces 33, 35 which in the closed condition of the segment shown in FIGS. 5 and 7 mate with corresponding part frustoconical surfaces 36, 38 of the remainder 31 of the pipe 34. The segment 29 also has two opposed side edge surfaces 40, 42 which mate with corresponding lengthwise extending edge surfaces 44, 46 on the pipe remainder 31.

A rod 48 is connected to the exterior of segment 29 and extends away therefrom at an angle relative to the axis of pipe 34, this angle corresponding roughly to the angle of surfaces 33, 35 as presented to the axis of the pipe 34 in a generally radial plane in which the rod 48 is contained. At its opposite end, rod 48 is connected to the plunger 50a of an electromagnet 50. A spring 54 is interposed between the body of the magnet 50 and an outstanding flange 48a on rod 48 and normally urges rod 48 away from the electromagnet 50 to the condition shown in FIGS. 5 and 7 at which the segment 29 neatly fits into the space in the pipe 34 defined by the surfaces 36, 38, 44 and 46. Although not shown, in order to facilitate sealing, the surfaces 33, 35 of the segment 29 may be made slightly convergent in the direction away from the outside surface of the segment 29 towards the axis of the pipe 34. Similarly, the surfaces 40 and 42 may be made convergent in the direction away from the outer surface of the segment 29 towards the axis of the pipe 34.

Figure 5:
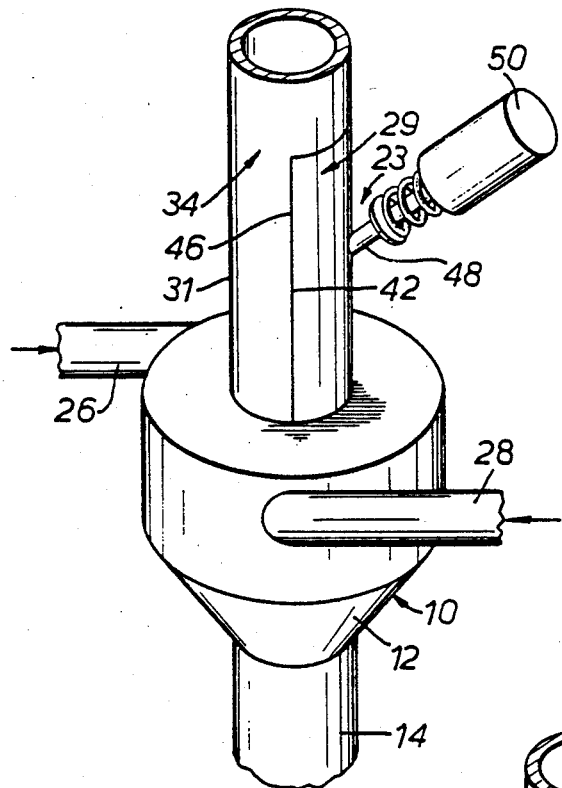
FIG. 5 is a fragmentary perspective view of the cyclone separator of FIG. 1 showing outlet area varying means in accordance with the invention.
Figure 6:
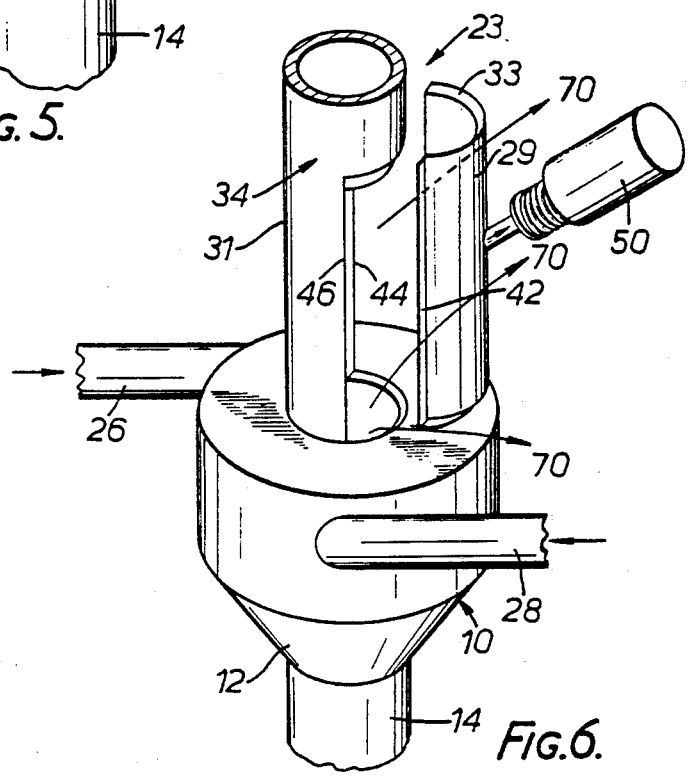
FIG. 6 is a view like FIG. 5 but showing the outlet area varying means operated.

In the condition of FIGS. 5 and 7, the cyclone separator can operate normally, one of two components of the liquid admitted via pipes 26 and 28 being delivered, as previously described, from the separating chamber cylindrical portion 12 through the outlet constituted by the pipe 34 and its interior opening 34a with the interior of chamber portion 12. The liquid flow under these conditions is shown by arrows 56.

Under the condition that the outlet constituted by pipe 34 and outlet opening 34a should become blocked, it is possible, by energizing of electromagnet 50, to withdraw the rod 48 into the body of the electromagnet against the resilient bias applied by spring 54. Under this condition, then, the segment 29 is correspondingly moved outwardly of the remainder 31 of the pipe 34 so that an enlarged opening 68 then defined by the aforementioned surfaces 36, 38, 44, 46 is provided for egress of material from the separator. By this means, obstructions such as stones or the like may be readily cleared from pipe 34 and/or opening 34a. The flow of such egress is indicated by the arrows 70 in FIGS. 6 and 8.

In order to provide for automatic operation, the area varying means of the invention may, as shown in FIGS. 7 and 8, include a flow sensitive device 72. Device 72 includes a light planar vane 74 positioned within pipe 34 and connected to a shaft 76 which is mounted for free rotation in a bearing (not shown) in the side wall of the pipe 34. Shaft 76 extends, from an inner end within the pipe 34, exteriorly of the pipe 34. The shaft is mounted so that it is rotatable about an axis which extends generally radially to the direction of extent of the pipe 34. At its outer end, shaft 76 has two radial arms 78, 80 which extend oppositely therefrom. Arm 80 is located adjacent a free end of an operating button 90a of a switch 90. Arm 78 is connected, at its end remote from shaft 76, to a tension spring 92. Spring 92 is arranged to normally bias arm 78 and shaft 76 to a position such that arm 80 assumes the position shown in FIG. 8 at which the arm 80 is positioned at a limit distance away from the body of the switch 90. The operating button 90a of the switch 90 is resiliently biased away from the body of the switch and thus, at this condition, is at an extreme extension from the body. Under this condition, the switch 90 is closed. It will be noted from FIG. 8, too, that the vane 74 is so located relative to the shaft 76 that under the condition of FIG. 8 the vane does not extend in the axial direction of the shaft 34 but is angularly displaced relative thereto.

Under the condition of flow through pipe 34, the flow so acts on vane 74 as to cause the shaft 76 to be rotated to the condition shown in FIG. 7. During this rotation, which occurs against spring bias of spring 92, the arm 80 is brought to bear on the button 90a so as to axially move the button towards the body of switch 90 at which condition the switch 90 is arranged to be open.

As shown in FIG. 9, the switch 90 is arranged in an electric circuit 94 so that when closed it operates to effect energization of a relay coil 94a from a low voltage source 96. Electric contacts 95b associated with a relay coil 95a are likewise arranged in an electric circuit 98 so that when closed the contacts ensure energization of the winding 50b of electromagnet 50 from an electric source 100. The arrangement is such that, under normal conditions of flow through pipe 34, switch 90 is not actuated, the vane 74 assuming the position shown in FIG. 7. Under conditions of flow blockage however, there will be reduced flow through pipe 34 with the result that there is insufficient fluid pressure to maintain the vane 74 in the generally axial direction of the pipe 34, against the bias of spring 92, whereupon the spring 92 operates as just described to rotate the shaft 76 and thereby effect closing of switch 90. Resultant operation of the electromagnet 50 causes withdrawal of the plunger 50a, so conditioning the means 23 as shown in FIG. 8 to permit clearance of the blockage. After clearance as shown in FIG. 8, resumption of flow through the pipe 34 will occur and the apparatus will be conditioned again to the condition of FIG. 7. In order to facilitate reversion back to the condition of FIG. 7, it is possible to modify the circuit of FIG. 9 to include timing and resetting means such that the contacts 95a remain closed only for a predetermined time following an initiation of closing pursuant to closing of switch 90.

Figure 10:
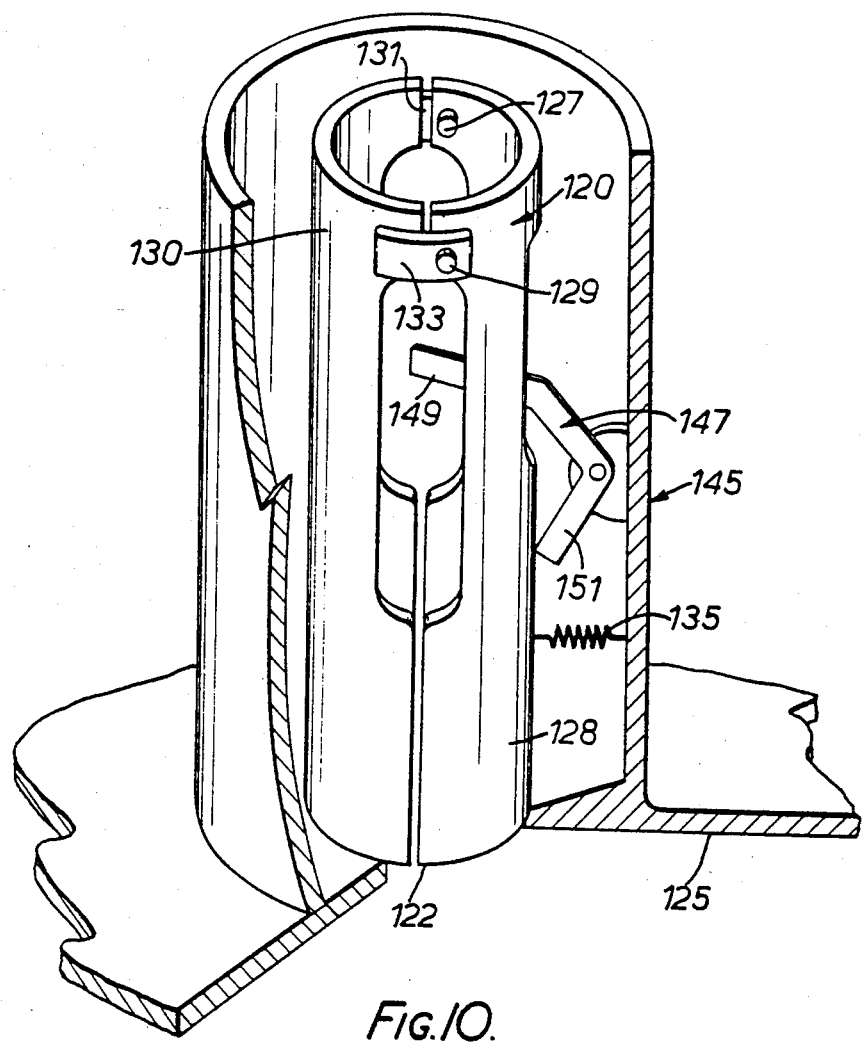
FIG. 10 is a partly sectioned perspective view of an alternative form of area varying means constructed in accordance with the invention.

Referring now to FIG. 10, a modified area varying means 124 is shown for use in conjunction with an outlet pipe 120 of a cyclone separator 110. The separator 110 is, aside from the different form of the area varying means 124, similar to the separator 10 previously described, the outlet pipe 120 corresponding in function generally to the outlet pipe 34 previously described, and extending away from an outlet opening 122 generally performing the same function as the outlet opening 34a previously described.

Figure 11:
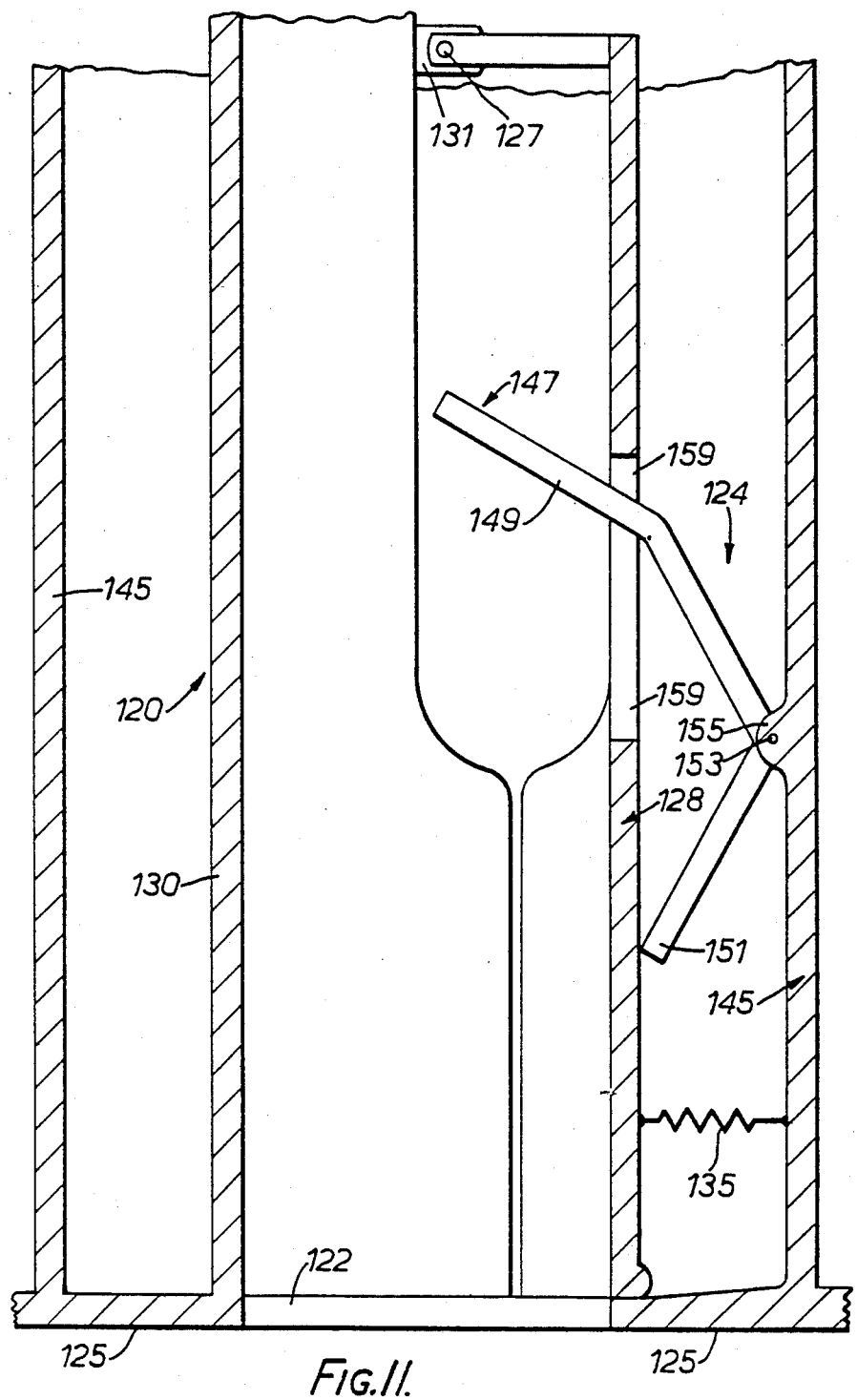
FIGS. 11 and 12 are cross-sectional views of the area varying means of FIG. 10 shown, respectively, in closed and open conditions.
Figure 12:
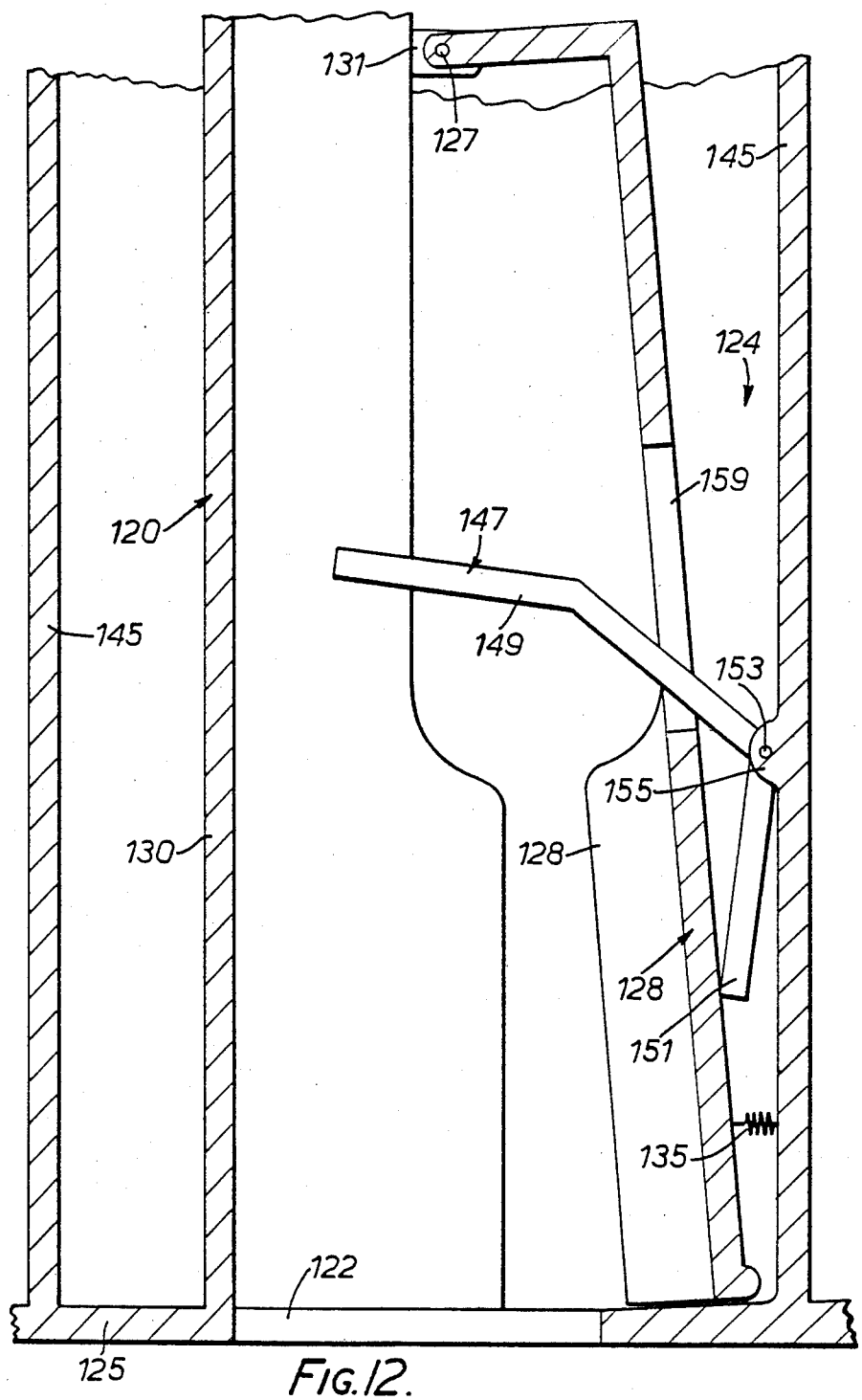

The pipe 120 has a movable portion 128 which forms one segment of the total periphery of the pipe and which is pivotally secured to the remainder 130 of the pipe. Remainder 130 is secured, such as by welding, to the end wall 125 of the separator, about opening 122. Portion 128 is pivoted, at a location downstream of opening 122, to the remainder 130 of pipe 120 by coaxial pivot pins 127, 129 which extend through lugs 131, 133 on the pipe remainder. At locations adjacent the outlet 122, the remainder 130 and pipe portion 128 are of generally arcuate configuration when viewed in cross-section, fitting together, in the operative position of the means 124, in the fashion shown in FIGS. 10 and 11 to define a substantially circular cross-sectioned flow path for fluid flow from outlet 122. As shown in FIG. 12, however, the portion 128 is swingable about the common axis of the pins 127, 129 so that, adjacent the opening 122, the portion 128 is swung outwardly to increase the space between the portion 128 and remainder 130 of pipe 120 so increasing the outflow area and permitting clearance of blockages.

A light helical tension spring 135 is provided between the lower end of portion 128 and an outer flow collecting pipe 145 secured to separator wall 125 in coaxial spaced relationship around pipe 120. Spring 135 provides a resilient bias so directed as to tend to cause the portion 128 to assume the open condition shown in FIG. 11. However, in normal use, with fluid flow through outlet 122 into the pipe 120, the portion 128 is held biased in its closed position by fluid pressure force acting on a lever 147. Lever 147 has two arms 149, 151 each radiating from a central portion of the lever. The lever is pivotally mounted to the pipe 145 at that central portion by means of a pin 153 passing through lugs 155 on the interior surface of the pipe 145. Arm 151 extends generally against the flow direction in pipe 130 from pin 153 to an outer end which engages the exterior of portion 128 at a location well away from its pivot axis about pins 127, 129. Arm 149 extends away from pin 153, through a clearance slot 159 in portion 128 and thence generally transversely across the interior of the pipe 120 between the portion 128 and the remainder 130 of the pipe.

In the absence of flow from outlet 122 through pipe 120, lever 147 is positioned as shown in FIG. 12, with the free end of the arm 151 against the exterior surface of portion 128. However, when flow occurs through the pipe 120 the flow impinges upon the arm 149 of lever 147 thus subjecting it to a pressure force which is directed away from the opening 122 in the direction of flow of the liquid through pipe 120. The force is arranged to be sufficient to cause movement of the arm 149 and thus of the lever 147 so that the lever is pivoted in the clockwise direction from the position as shown in FIG. 12, so that the pressure force acting on arm 149 is transferred through the lever to apply a force at the opposite end thereof, namely at the free end of arm 151, against portion 128 thus causing the portion to be pivoted, with corresponding pivotal movement of the lever 147, to close the gap between the portion 128 and the remainder 130. That is to say, the action is thus to move the portion 128 from the condition shown in FIG. 12 to that shown in FIG. 11, against the bias of spring 135. By this means, in normal use, the portion 128 is maintained closed, only opening under condition where, due to blockage, there is no flow through the pipe 120 whereupon the pressure force acting on arm 149 is reduced to the extent that the spring 135 can operate to bias the portion 128 open. This arrangement has the advantage that it has no electrical parts and is mechanically simple, whilst nevertheless operating automatically to increase the area for outflow of the fluid under blockage conditions and to again decrease the area for outflow to a normal condition on clearing the blockage.

Referring now to FIGS. 13 to 17, the modified area varying means 224 shown therein is for use in conjunction with an outlet pipe 220 of a cyclone separator, such as the separator 10. The outlet pipe 220 performs the function of the earlier described outlet pipe 34. The area varying means 224 has a circular plate 221 adapted for securement to a transverse end wall of the separator so that an outlet opening 222 through the plate 221 and leading to the interior of the pipe 220 then performs the function of the previously described outlet opening 34a.

Pipe 220 has a removable portion 228 which forms one segment of the total periphery of the pipe and which is pivotally secured to the remainder 230 of the pipe. The pivotal securement is effected by means of two lugs 233, 235 secured to the portion 228 and pivoted to the pipe remainder 230 by means of pivot pins 237 arranged on a common side-to-side pivot axis on the remainder 230. The pipe 220 has an interior bore extending from opening 222 to an outlet aperture 271 at the end of the pipe remote from plate 221. As best seen from FIGS. 16 and 17 this bore has two sections, a larger diameter bore section 273 adjacent opening 222 and a lesser diameter section 275 adjacent aperture 271. Remainder 230 of pipe 220 is formed with lengthwise extending surfaces 279, 281 which are disposed to opposite sides of bore section 275 and portion 228 has corresponding lengthwise extending surfaces 283, 285 which, in the closed condition of the area varying means, sealingly engage the respective surfaces 279, 281. The bore section 275 is, for one lengthwise extending half thereof, defined within remainder 230 and for the other lengthwise extending half, defined within portion 228. At a portion of the larger diameter bore section 273 adjacent the junction between sections 273 and 275, the portion 230 has a transverse, planar, somewhat U-shaped surface 287 which extends, at opposite ends of that surface, to meet respective ones of the surfaces 279 and 281 and thence extends obliquely to the top of the outer surface of the remainder 230 as viewed in the sections of FIGS. 16 and 17. The U-shaped configuration of the surface 287 can, however, be appreciated from FIG. 15. The portion 228 has a similar U-shaped surface 289 which in the closed position of the area varying means engages with surface 287.

Plate 221 carries a generally U-shaped bracket 290 and a shaft 292 extends between the opposed arm portions thereof and is retained therein so as to be freely rotatable about an axis extending transversely of the pipe 220 and generally parallel to the plane containing surfaces 279, 281. Shaft 292 has secured thereto two elongate arms 294, 296 which extend away from the shaft to free ends positioned over the end of pipe 220 remote from opening 222. A plate 297 is secured to the free ends of the arms 294, 296 and extends generally transversely thereto to the directions of extent of the arms. Intermediate the ends of the shaft 292, the shaft is provided with a downwardly depending cam element 298 which is secured for rotation with the shaft. Cam element 298 has a lower cam surface 298a which is of arcuate form and which co-operates with an arcuately curved cam surface 300a on a projection 300 extending upwardly from portion 228.

Figure 13:
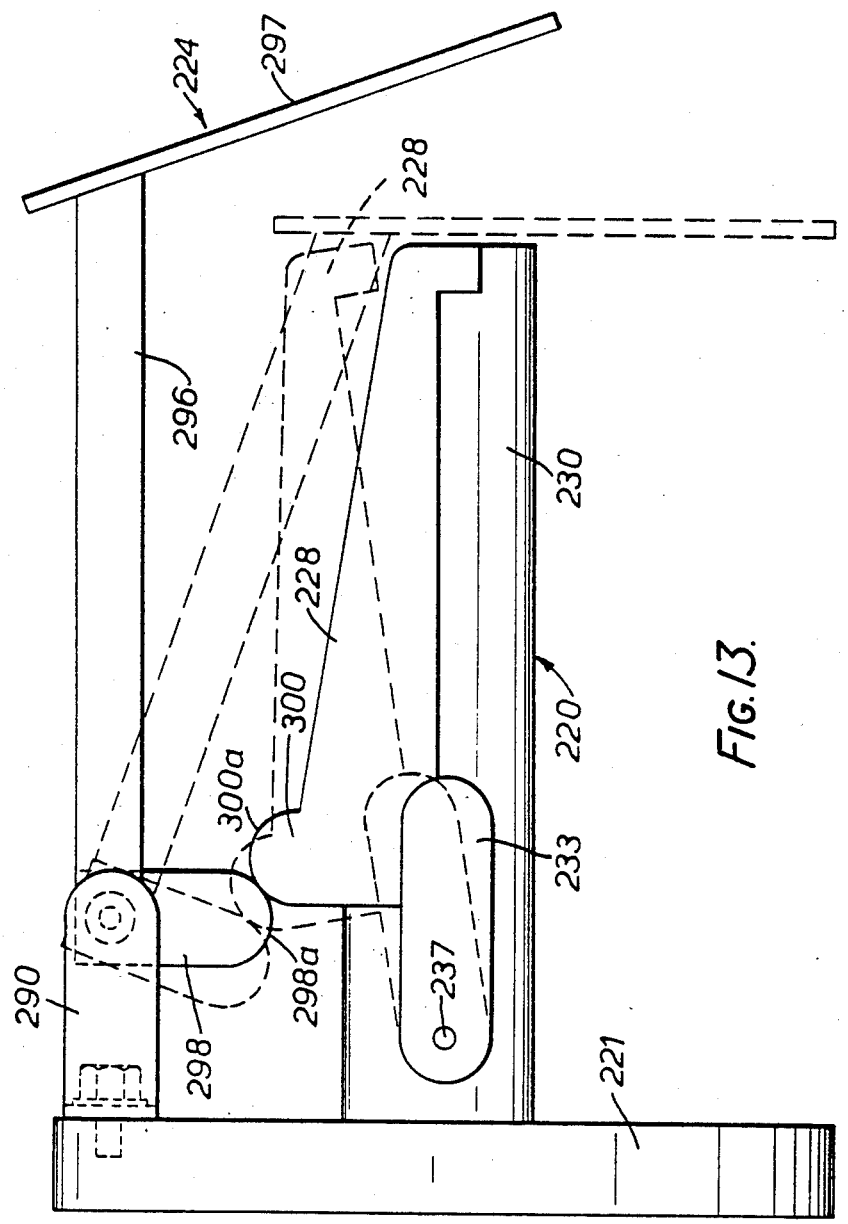
FIG. 13 is a side view of a still further form of area varying means constructed in accordance with the invention.

In normal operation of the device 224 the portion 228 occupies the position shown in FIGS. 13 and 16 where the portion 228 is engaged with the remainder 230 so as to fully define the two bore sections 273, 275. Liquid leaving the cyclone separator passes through opening 222 thence through bore section 273 and then through bore section 275 to exit via aperture 271. The bore section 275 is of relatively small diameter to provide proper operation of the separator. Liquid egressing from aperture 271 strikes plate 297 and exerts sufficient force thereon to normally cause the arms 294, 296 to pivot such that the plate 297 is held away from the aperture 271, as shown in FIG. 13. Under this condition, the cam surface 298a on element 298 engages cam surface 300a on portion 228 in such a fashion as to cause force exerted by the egressing liquid on the plate 296 and transferred through the arms 294, 296 to the element 298, to press on the portion 228 so maintaining it in the position of FIGS. 13 and 16. Under the condition, however, where blockage of outlet 222 occurs and there is reduced flow through the bore sections 273 and 275, the force exerted by liquid emerging from aperture 271 will be insufficient to maintain the plate 297 clear of the aperture whereupon arms 294, 296 pivot clockwise as shown in FIG. 13 so that plate 297 moves downwardly as viewed in FIG. 13. This causes the cam surface 298a to be moved, by corresponding clockwise pivoting of element 298, away from cam surface 300a, thus removing constraint against pivoting of the portion 228 about the axis of pins 237. Under this condition, then, liquid pressure in the bore section 273 may bear against the portion 228 in such a fashion as to effect anti-clockwise pivoting of portion 228 as viewed in FIG. 13 so as to bring portion 228 to the condition shown in FIG. 17 whereupon the surfaces 279, 281 and 287 on remainder 230 of pipe 220 are well cleared from the corresponding surfaces 283, 285 and 289 on portion 228, so as to present a substantial gap therebetween, such gap being indicated by reference numeral 295 in FIG. 17. Thus, material causing a blockage in the outlet 222 may be readily cleared by outflow of liquid through that gap. Once such clearance has occurred, the portion 228 may revert to the initial condition shown in FIG. 16 under gravitational action, accompanied by clockwise rotation about the axis of the pins 237. If desired, in order to facilitate the return action, a resilient tension spring may be provided acting between portion 228 and remainder 230. Alternatively, in order to facilitate the action of the cam surface 298a, a spring may be provided between the projection and say, the plate 221 to lightly bias the element 298 for clockwise rotation about the axis of shaft 292.

Figure 14:
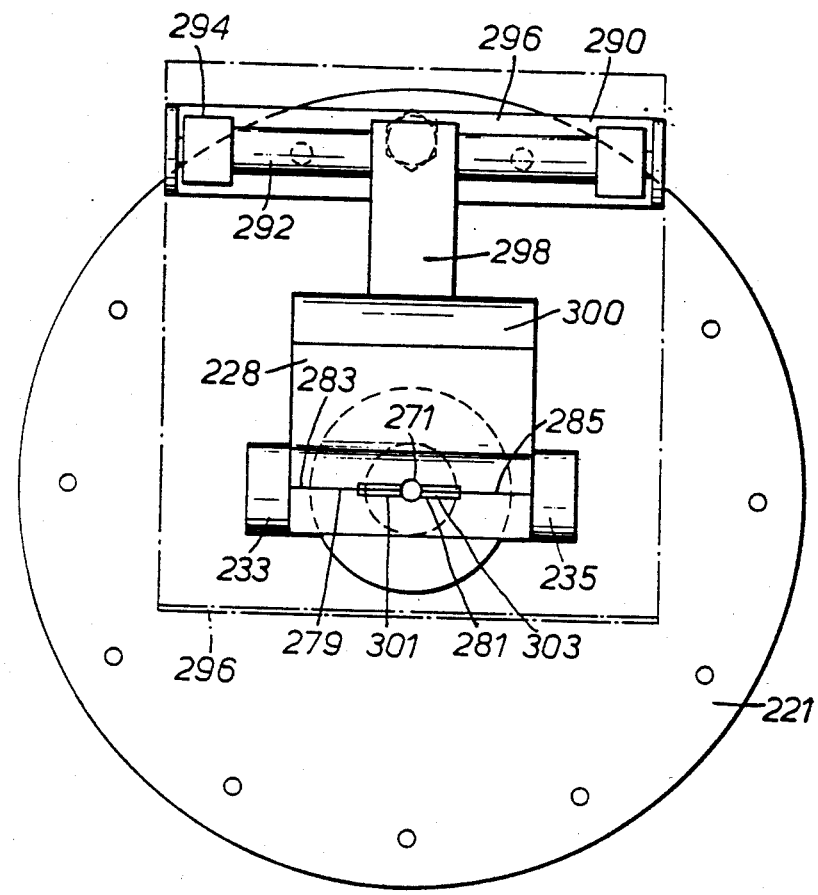
FIG. 14 is an end view of the area varying means of FIG. 13.
Figure 15:
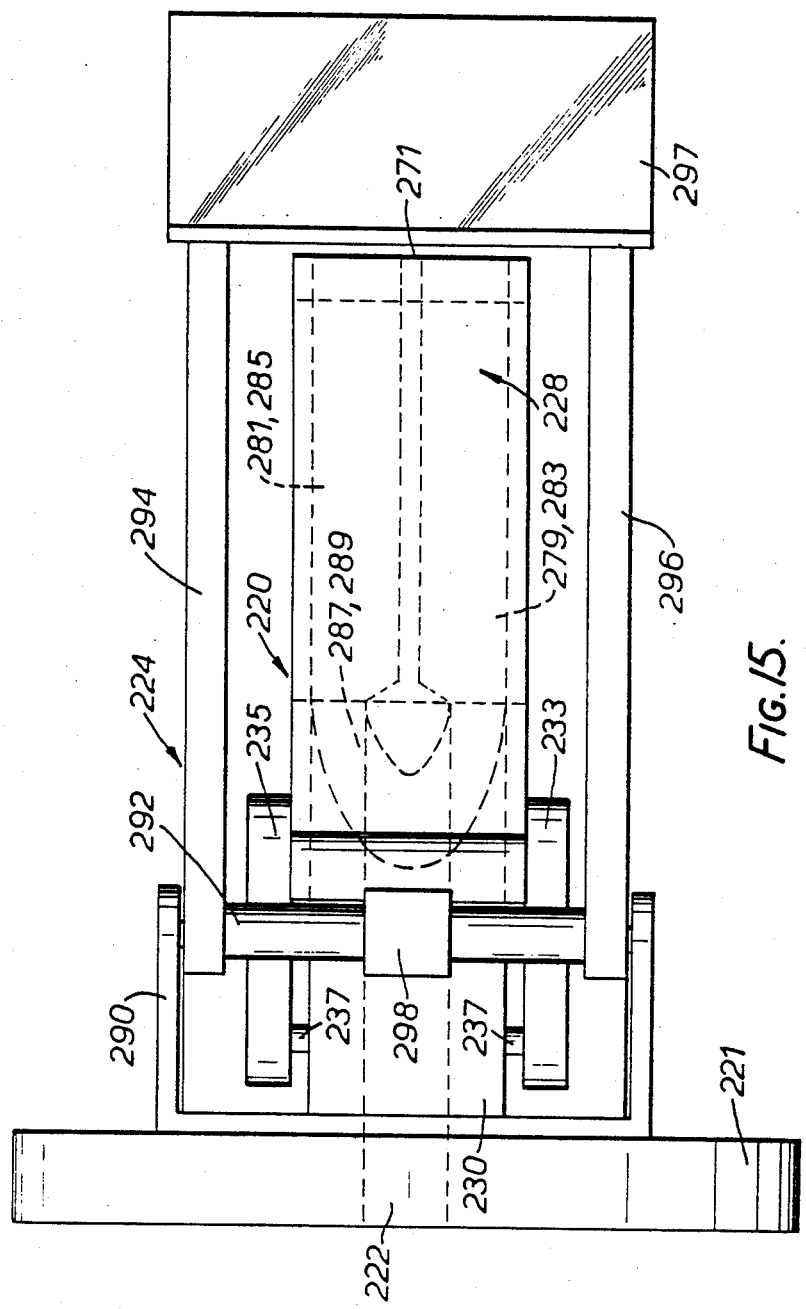
FIG. 15 is a plan view of the area varying means of FIG. 13.

In order to improve sealing between portion 228 and remainder 230 of pipe 220, the surfaces 279, 281 and 287 thereof may have suitable sealant strips positioned therein. Two such strips, designated by respective reference numerals 301, 303, are shown in FIG. 14 as set into surfaces 279, 281. The strips may be formed, for example, of neoprene.

Figure 21:
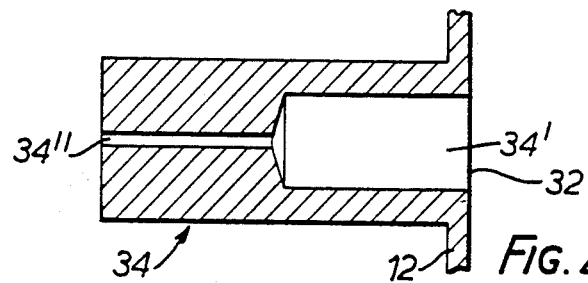
FIG. 21 is a fragmentary axial cross section showing an alternative form of overflow outlet pipe for the cyclone separator of FIG. 1.

FIG. 21 shows a modified overflow outlet pipe 34 usuable instead of the overflow outlet pipe 34 in the construction of FIG. 1. In this case the pipe has a stepped interior bore leading from outlet opening 32. More particularly, the bore has a first portion 34' adjacent outlet 32 of diameter equal to the diameter of outlet 32 and a second portion 34" away from outlet 32 of lesser diameter than bore portion 34'. Bore portion 34' may be of diameter in the range 0.125 to 0.625 preferably 0.17 to 0.47 times the diameter $d_1$ of portion 12 of the separating chamber 25. Bore portion 34" may be of diameter 0.015 to 0.05 preferably 0.025 to 0.035 times the diameter $d_1$ of portion 12 of the separating chamber 25. The lengths of the bore portions 34' and 34" are not important.

Figure 22:
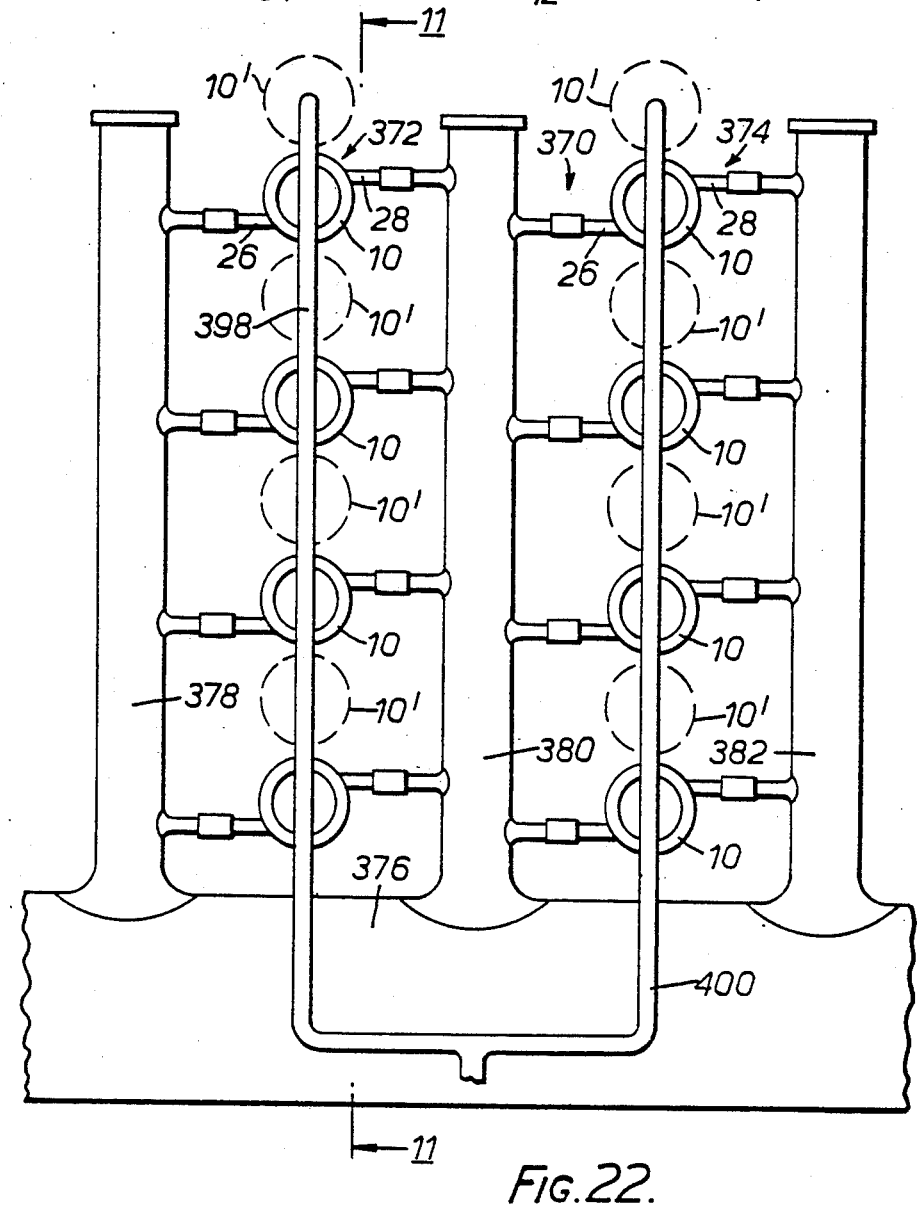
FIG. 22 is an end view of a bank of separators as shown in FIG. 1.
Figure 23:
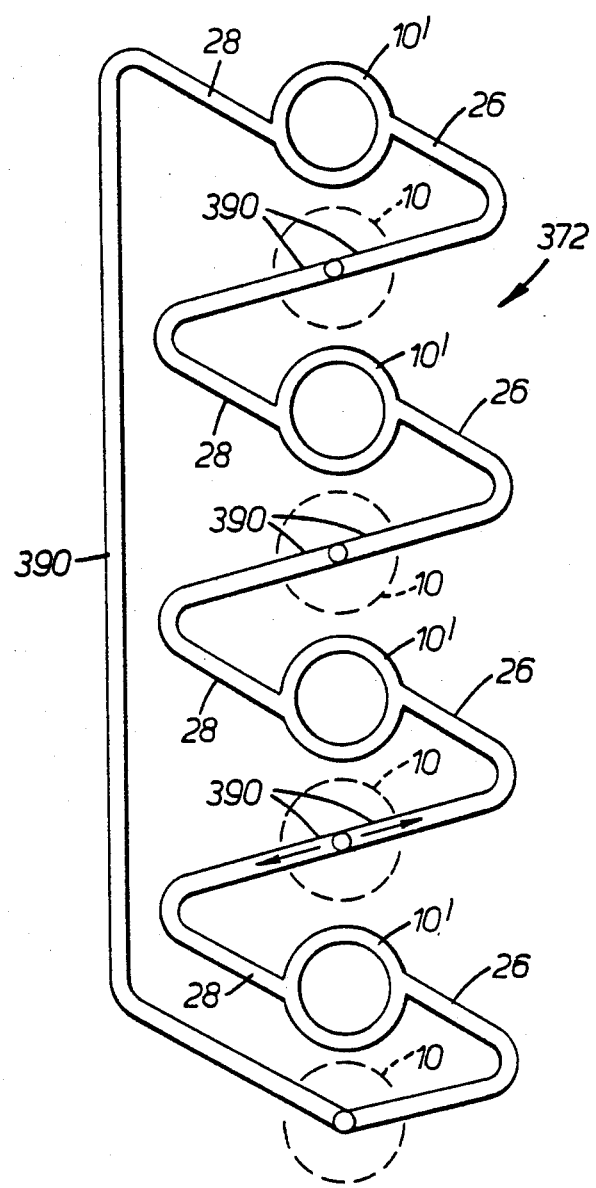
FIG. 23 is a diagrammatic opposite end view of one row of separators in the bank of separators shown in FIG. 22.
Figure 24:
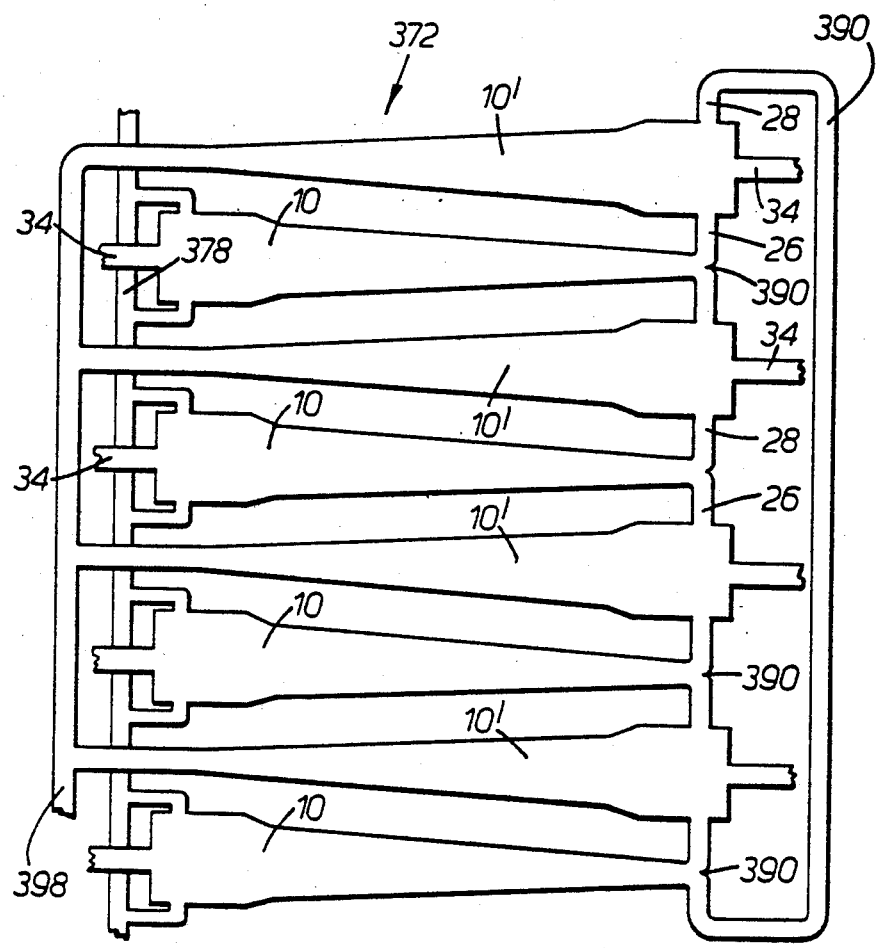
FIG. 24 is a diagrammatic cross section of the bank of separators of FIG. 22, taken approximately on the line 24—24 in FIG. 22.

FIGS. 22 to 24 show an arrangement of sixteen separators 10 and 10' in a bank 370. These are arranged in two vertical rows 372, 374 of eight separators each. A single main inlet feed pipe 376 is provided, this having three upright parallel secondary feed pipes 378, 380, 382 extending therefrom at spaced locations along the length thereof. The inlet pipes 26, 28 of four of the separators, separators 10, in row 372 are connected respectively to pipes 378 and 380 whilst the inlet pipes 26, 28 of four of the separators, also separators 10, in row 374 are connected respectively to pipes 380, 382.

The separators 10' are arranged four in each of the two rows 372, 374, three between each adjacent pair of separators 10 in the row and one above the uppermost 10 in each row. The separators 10' are arranged with their outlet ends of their portions 16 oppositely directed to those of the separators 10.

The separators 10 and 10' in this case are not provided with fourth portions 18 but are arranged with the third cylindrical portions 16 at the outlets thereof.

As is best seen from FIG. 24, the portions 18 of the separators 10 are connected by branched pipelines 390 to the inlet pipes 26, 28 of the separators 10'. In the case of the uppermost three separators 10 in each row 372, 374, the cylindrical portion 16 of each extends via the associated branched pipeline 390 to communicate with the inlet pipe 26 of the separator 10' immediately above and the inlet pipe 28 of the separator 10' immediately below. The lowermost separator 10 in each row provides communication via the pipeline 390 thereof with the inlet pipe 20 of the separator 10' immediately above and with the inlet pipe 28 of the uppermost separator 10'. The last mentioned pipeline 390 for each row is thus longer than the remaining pipelines 390.

The outlets at portions 16 of separators 10' in row 372 are connected to a common outlet line 398. A similar outlet line 400 interconnects the outlets at portions 16 of separators 10' in row 374 and these outlet lines 398 and 400 may be connected together as shown. Although not shown, for clarity, the outlet pipes 34 of all of the separators 10, 10' in both rows may be connected to a common line.

In use of the bank 370, oil-water mixture is fed to the main inlet feed pipe 376 and thence via the secondary feed pipes 378, 380, 382 to the separators 10 in each of the rows 372, 374. This then flows through separators 10 of each bank. One half of the separated water component from each separator 10, appearing at the outlet of portion 16, is then fed to a separator 10' in that row, whilst the again separated water from the separators 10' is taken from the bank via the lines 398, 400. Separated oil emerging from the separators 10, 10' is collected such as in a single collector pipeline. By this arrangement, oil-water mixture is passed in succession through to separators before reaching the water outlet from the bank. This arrangement has been found to be very satisfactory in use.

Figure 25:
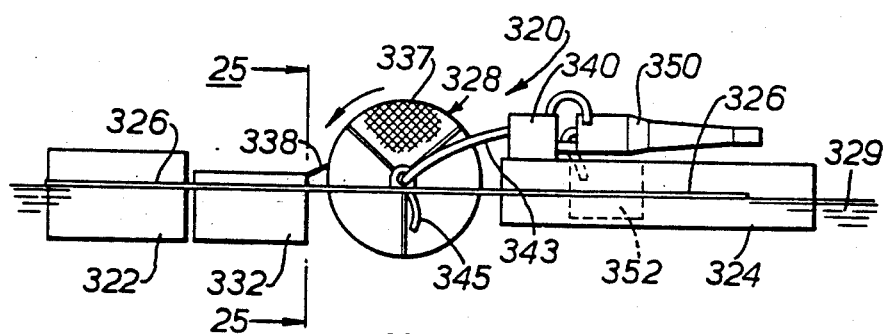
FIG. 25 is a diagrammatic side view of an oil spillage clean-up apparatus constructed in accordance with the invention.

FIG. 25 shows an oil spillage clean up apparatus 320 constructed in accordance with the invention. Apparatus 320 includes two floats 322, 324 joined by a frame 326 and which support the apparatus for floating on the sea 329. Frame 326 carries a hollow cylindrical sieve 328 mounted for rotation about a transverse axis at a location between floats 322, 324. A motor 330 is provided for driving sieve 328 so that it rotates about its axis. Sieve 328 is formed of an open framework having two side by side circular frames 329, 331 interconnected by side to side frame members 333. The whole of the framework is covered by open mesh material 337. A debris collection bucket 332 is carried by frame 326 and debris collected on the periphery of the sieve 328 as it rotates is directed to this bucket by a planar blade 338 which portion is adjacent the bucket and adjacent the periphery of the sieve.

Figure 26:
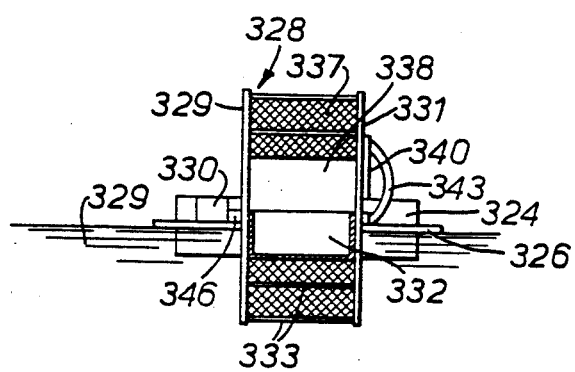
FIG. 26 is a cross section on the line 25—25 in FIG. 21.

Float 324 carries a pump 340 having its inlet in communication via piping with the interior of the sieve 328. This piping may include a pipe line 343 communicating via a fluid tight coupling with a fixed hollow shaft 346 (FIG. 26), which carries sieve 328, and a further inlet pipe 345 which extends downwardly from a side opening in shaft 346 to an inlet adjacent the inner periphery of the sieve 328. The outlet of pumps 340 is connected to supply a cyclone separation 350 of form like that shown in figure 1. Oil removed from the overflow outlet pipe of the separator 350 is directed to an oil container 352. In use, apparatus 320 is towed or driven over the sea and through floating oil thereon. The oily water is sucked through inlet pipe 345 by pump 340 and thence directed for separation by the separator 350. Separated oil is directed to the container 352 and clean water is directed to the sea. The rotating sieve 328 serves to prevent debris from entering the inlet pipe 345. Debris is, instead, entrained on the periphery of the sieve and taken off by the blade 338, as it passes the blade, and is thence directed to bucket 332.

Operation of the separator of FIG. 1 when separating oil and water may be facilitated by arranging for entrainment of a suitable emulsion breaker into the incoming water-oil mixture.

The entrainment may be effected by use of known dosing techniques such as injecting an emulsion breaker into the incoming liquid prior to feeding to the feed pipes 26, 28.

Commercially available emulsion breakers have been found quite satisfactory. The emulsion breaker "Nalco 7723" marketed by Catoleum Pty Ltd Botany N.S.W. Australia was found effective when injected in concentrations in the range 5 to 8 p.p.m.

In the described arrangement, although no specific provision is provided to generate back pressure in the separators 10, 10' so as to cause flow constriction, such back pressure and flow restriction is provided, for the separators 10, by the separators 10' themselves which are connected to the portions 16 of separators 10, and, for the separators 10', by the outlet lines 398, 400 which are suitably dimensioned for the purpose. If necessary, however, a common flow constriction device could be inserted at an outlet pipe providing connection to both of lines 398, 400.

Referring to FIG. 27, the separator 500 has a separating chamber 501 which includes a primary portion having a first cylindrical section 504 of frusto-conical form and a second cylindrical section 506 of generally straight cylindrical form. A tangential inlet 520 is provided at one end of the first cylindrical section 504. An overflow outlet 522 and an underflow outlet 524 are provided at each end of the separating chamber.

As shown in the drawing a secondary portion 508 is disposed at the underflow outlet end 524. As shown, the portion 508 has means 530 for varying the area of the outlet from that secondary portion 508. This secondary portion 508 has the effect of providing for better separation of the oil/water mixture as it passes through the separating chamber.

The overflow outlet end 522 of the separating chamber may take different forms. For example, it may simply comprise an outlet tube of diameter $d_o$ or in an alternative arrangement may be in the form of a stepped bore having a first part 510 followed by an outlet tube of diameter $d_o$.

In one experiment conducted, a hydrocyclone of the type shown in FIG. 27 was used. The dimensions of the hydrocyclone used in the experiment were as follows:

$l_1 = 920$ mm
$l_2 = 700$ mm
$d1 = 70$ mm
$d2 = 17.5$ m The area of the outlet $A_2$ was varied between 40% to 60% of the area of the inlet A, of the secondary portion 508.

A mechanically generated oil in water emulsion was provided with a mean oil drop size of approximately 30 micron. The water temperature was 16.5° C. was standard industrial grade diesel.

| Water Inlet Flowrate/ min. | Water Inlet Conc. ppm | Inlet Pressure kPa | Water Outlet kPa | Water Outlet Conc. ppm | Reject Ratio | % Area Open | Efficiency % |
|---|---|---|---|---|---|---|---|
| 73 | 959 | 280 | 155 | 46 | 3.2 | 50% | 94 |
| 73 | 822 | 320 | 200 | 44 | 3.9 | 40% | 95.0 |
| 101 | 940 | 450 | 200 | 41 | 1.9 | 60% | 95.6 |
| 102 | 1470 | 440 | 195 | 62 | 1.0 | 55% | 95.8 |

In this particular test the efficiency did not alter significantly between the two arrangments of the overflow outlet.

The described arrangmeent has been advanced merely by way of explanation and many modifications may be made thereto without departing from the spirit and scope of the invention which includes every novel feature and combination of novel features herein disclosed.

I claim:

1. A cyclone separator comprising elements designed, sized and arranged for treating a mixture of fluids and more particularly an oil/water mixture for separating a more dense component from a less dense component thereof, said separator comprising a separating chamber having a primary portion which has a greater cross-sectional diameter at one end than at its other end and further having an overflow outlet at said one end thereof and an underflow outlet at said other end; at least one tangentially directed feed inlet proximate to said one end, said separator further including means designed, sized and arranged for acting to preclude contamination of the more dense component emerging from the underflow outlet by the less dense component, said means having an inlet end downstream of said other end of said primary portion with respect to the direction of flow of said separated more dense component, and an outlet end, said means presenting a passageway for throughflow of the more dense component, the diameter of which passageway has a diameter at said outlet end thereof which is from ⅓ to 0.8 the diameter thereof at said inlet end thereof.

2. A cyclone separator as claimed in claim 1 wherein said primary portion is of a length which is at least ten times its diameter at the plane of said feed inlet.

3. A cyclone separator as claimed in claim 1 wherein said means is comprised by a secondary portion of said separating chamber at said underflow outlet.

4. A cyclone separator as claimed in claim 1 wherein said primary portion comprises a first cylindrical section and a second cylindrical section contiguous therewith said overflow outlet being disposed at an end of said first section remote from said second section, said second section having said underflow outlet at an end thereof remote from said first section, said means being comprised by a third section at said underflow outlet.

5. A cyclone separator as claimed in claim 1 wherein said primary portion comprises a frustoconical section and said means is comprised by a secondary portion of said separating chamber at said underflow outlet.

6. A cyclone separator as claimed in claim 5 wherein said outlet pipe has a substantially constant diameter.

7. A cyclone separator as claimed in claim 1 wherein said means includes an outlet pipe extending from the underflow outlet.

8. A cyclone separator comprising elements designed, sized and arranged for treating a mixture of fluids for separating a more dense component from a less dense component thereof, said separator comprising a separating chamber having a primary portion which has a greater cross-sectional dimension at one end than at its other end and further having an overflow outlet at said one end thereof and an underflow outlet at said other end; at least one tangentially directed feed inlet proximate to said one end, said overflow outlet being in the form of a stepped bore to faciliate operation of the cyclone separator by reducing blocking therein, the stepped bore including: a first bore portion having a diameter of sufficient size to facilitate the preclusion of blocking therein, the first bore portion being adjacent said one end of said primary portion of said separating chamber, and a second bore portion of lesser diameter than the first bore portion, the diameter of the second bore portion being sufficiently large to permit continuous operation of the overflow outlet, the second bore portion being further from said one end of said primary portion.

9. A cyclone separator according to claim 8 wherein said overflow outlet is provided with means selectively operable to vary the the cross-sectional area of said outlets for permitting clearing of a blockage when occurring in that outlets.

10. A cyclone separator as claimed in claim 9 wherein flow sensitive means is provided positioned and operable for detecting a decrease in flow through said outlets and for operating said area varying means for increasing the cross-sectional area for said clearing.

11. A cyclone separator as claimed in claim 10 wherein said outlet is in the form of an outlet pipe and the cross-sectional area varying means comprises a mechanism including a portion of the wall of the pipe which is so movable as to open the side of the pipe to the exterior thereof.

12. A cyclone separator as claimed in claim 11 wherein said portion is a side segment of the pipe which is movable outwardly away from the remainder of the pipe under influence of said mechanism 13. A cyclone separator as claimed in claim 12 wherein said mechanism includes an electromagnet and the said flow sensitive means operates to apply electric current to said electromagnet for effecting movement of the segment away from the remainder of the pipe on said detecting of decrease in flow.

14. A cyclone separator as claimed in claim 13 wherein the pipe wall portion is pivotally movable away from the remainder of the pipe.

15. A cyclone separator as claimed in claim 14 wherein the pipe wall portion is arranged to be subject, in use, to a bias towards a position effecting said opening of the side of the pipe, and said flow sensitive means is positioned to be normally acted upon directly by flow through the pipe to impart a force thereon which is directed against the outlet pipe wall portion to maintain it closed, said force, however, being reduced in the case of reduced flow through the pipe due to blockage whereby the aforementioned bias effects movement to open the side of the pipe.

16. A cyclone separator as claimed in claim 15 wherein the flow sensitive means comprises a pivotal lever having two arms extending from a location at which the lever is pivotal to said remainder of said pipe, one said arm being formed with means in use subjected flow thereonto from the separator and the other engaging the said pipe wall portion.

17. A cyclone separator comprising elements designed, sized and arranged for treating a mixture of fluids for separating a more dense component from a less dense component thereof, said separator comprising a separating chamber having a primary portion which has a greater cross-sectional dimension atone end than at its other end and further having an overflow outlet at said one end thereof and an underflow outlet at said other end; at least one tangentially directed feed inlet proximate to said one end, said overflow outlet being in the form of a stepped bore to facilitate operation of the cyclone separator by reducing blocking therein, the stepped bore including: a first bore portion having a diameter of sufficient size to facilitate the preclusion of blocking therein, the first bore portion being adjacent to said one end of said primary portion of said separating chamber; and a second bore portion of lesser diameter than the first bore portion, the diameter of the second bore portion being sufficiently large to permit continuous operation of the overflow outlet, the second bore portion being further from said one end of said primary portion, the separator having means designed, sized and arranged for acting to reclude contamination of the denser component emerging from said other end of said primary portion, said means comprising a constriction at said other end.

18. A cyclone separator according to claim 17, wherein said overflow outlet is provided with means selectively operable to vary the cross-sectional area of said outlets for permitting clearing of a blockage when occurring in that outlet.

19. A cyclone separator comprising elements designed, sized and arranged for treating a mixture of fluids for separating a more dense component from a less dense component thereof, said separator having a separating chamber having a primary portion which has a greater cross-sectional dimension at one end thereof than at its other end and further having an overflow outlet at said one end and an underflow outlet at said other end; at least one tangentially directed feed inlet proximate to said one end, said separator further including means designed, sized and arranged for acting to preclude contamination of the more dense component emerging from said other end portion by said less dense component, said means comprising a constriction at the other end of the primary portion, said constriction presenting a passageway for throughflow of said more dense component, the cross-sectional dimension of which passageway decreases away from said other end of said primary section to a dimension in the range ⅓ to 0.8 of the dimension of the passageway at the end of said constriction closest said other end of said primary portion; said overflow outlet being in the form of a stepped bore to facilitate operation of the cyclone separator by reducing blocking therein, the stepped bore including a first bore portion having a dimension of sufficient size to facilitate the preclusion of blocking therein, the first bore portion being adjacent said one end; and a second bore portion of lesser dimension than the first bore portion, the dimension of the second bore portion being sufficiently large to permit continuous operation of the overflow outlet, the second bore portion being further from said primary portion.

20. A cyclone separator according to claim 19, wherein said overflow outlet is provided with means selectively operable to vary the cross-sectional area of said outlets for permitting clearing of a blockage when occurring in that outlet.

* * * * *